(12) United States Patent
Bryan-Brown et al.

(10) Patent No.: US 6,727,968 B1
(45) Date of Patent: Apr. 27, 2004

(54) LIQUID CRYSTAL DEVICE ALIGNMENT

(75) Inventors: Guy Peter Bryan-Brown, Malvern (GB); Victor Chaklam Hui, Malvern (GB); John Clifford Jones, Malvern (GB); Ian Charles Sage, Malvern (GB); Emma Louise Wood, Malvern (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/529,159

(22) PCT Filed: Oct. 8, 1998

(86) PCT No.: PCT/GB98/03011

§ 371 (c)(1),
(2), (4) Date: Jun. 7, 2000

(87) PCT Pub. No.: WO99/18474

PCT Pub. Date: Apr. 15, 1999

(30) Foreign Application Priority Data

Oct. 8, 1997 (GB) ............................................. 9721214
Oct. 8, 1997 (GB) ............................................. 9721215
Oct. 8, 1997 (GB) ............................................. 9721229
Oct. 8, 1997 (GB) ............................................. 9721256

(51) Int. Cl.[7] ..................... G02F 1/1337; G02F 1/1333; C09K 19/02

(52) U.S. Cl. ..................... 349/123; 349/122; 349/169

(58) Field of Search ............................... 349/122, 123, 349/169, 132

(56) References Cited

U.S. PATENT DOCUMENTS 4,577,930 A    3/1986  Yang
4,697,884 A  * 10/1987  Amstutz et al. ............. 349/101
4,997,264 A    3/1991  Coulson (List continued on next page.)

FOREIGN PATENT DOCUMENTS

GB    2 209 610    10/1987
GB    2 210 468    10/1987

(List continued on next page.)

OTHER PUBLICATIONS

Merriam Webster's Collegiate Dictionary, 10TH Ed., pp. 1183 and 1355.*

(List continued on next page.)

Primary Examiner—T. Chowdhury
Assistant Examiner—Jeanne Di Grazio

(57) ABSTRACT

Liquid crystal devices are formed by a layer of a liquid crystal material enclosed between two cell walls, both carrying electrode structures, and one or both walls treated to align molecules of the liquid crystal material. Most alignment treatment give alignment and surface pretilt with a strong azimuthal and zenithal anchoring energy to contacting liquid crystal molecules. The invention reduces at least one of the azimuthal zenithal or translational anchoring energy to improve switching characteristics and optical performance by allowing movement of liquid crystal molecules at or close to the cell wall. The reduction of anchoring energy may be achieved by an oligomer or short chain polymer which is either spread on the surface or added to the liquid crystal material. The size of oligomer or short chain polymer is low enough that it does not appreciably phase separate from the liquid crystal material. The polymer layer has the characteristics of having imperfect solubility in the liquid crystal material used in the device, of having a physical affinity for the surface of the substrate, and of retaining a substantially liquid like surface at the polymer/liquid crystal interface. The polymer may be formed by polymerisation of reactive low molecular weight materials in solution in the liquid crystal fluid. The resulting solution or dispersion of polymer in liquid crystal is then filled into the cell, and the polymer is allowed to coat the substrate surfaces.

57 Claims, 10 Drawing Sheets

U.S. PATENT DOCUMENTS

| | | | |
|---|---|---|---|
| 5,011,624 A | * 4/1991 | Yamagishi et al. | 252/299.01 |
| 5,040,876 A | 8/1991 | Patel et al. | |
| 5,061,047 A | 10/1991 | Bradshaw et al. | |
| 5,189,534 A | 2/1993 | McDonnell et al. | |
| 5,450,220 A | * 9/1995 | Onishi et al. | 349/89 |
| 5,661,533 A | * 8/1997 | Wu et al. | 349/169 |
| 5,666,217 A | * 9/1997 | Kaneko et al. | 349/122 |
| 5,754,264 A | * 5/1998 | Bryan-Brown et al. | 349/123 |
| 5,796,459 A | * 8/1998 | Bryan-Brown et al. | 349/132 |
| 5,847,798 A | * 12/1998 | Yang et al. | 349/115 |
| 5,853,818 A | * 12/1998 | Kwon et al. | 427/510 |
| 5,920,368 A | * 7/1999 | Hatano et al. | 349/169 |
| 6,217,792 B1 | * 4/2001 | Parri et al. | 252/299.61 |
| 6,249,332 B1 | * 6/2001 | Bryan-Brown et al. | 349/128 |
| 6,327,017 B2 | * 12/2001 | Barberi et al. | 349/177 |

FOREIGN PATENT DOCUMENTS

| | | | |
|---|---|---|---|
| GB | 2 210 469 | | 10/1987 |
| GB | 2 236 403 | | 10/1990 |
| GB | 2 286 466 A | | 8/1995 |
| GB | 2 286 467 | | 8/1995 |
| GB | 2 286 893 A | | 8/1995 |
| JP | 04269721 A | * 9/1992 | G02F/1/1339 |
| WO | 92/00546 | | 1/1992 |
| WO | 95/22075 | | 8/1995 |
| WO | 97/14990 | | 4/1997 |
| WO | WO 97 14990 | * 4/1997 | G02F/1/1337 |
| WO | WO 87 06020 | * 8/1997 | G02F/1/137 |

OTHER PUBLICATIONS

Auld, B.A., et al., "Monolithic Acoustic Imaging Transducer Structures With High Spatial Resolution", *Applied Physics Letter*, vol. 25, No. 9, Nov. 1, 1974, pp. 478–481.

Clark, Noel A., "Submicrosecond Bistable Electro–Optic Switching In Liquid Crystals", *Applied Physics Letters*, vol. 36, No. 11, Jun. 1, 1980, pp. 899–901.

Gale, M.T., et al., ZOD Images: Embossable Surface–Relief Structures for Color and Black–and–White Reproduction, *Journal of Applied Photgraphic Engineering*, vol. 4, No. 2, Spring 1978, pp. 41–47.

Hutley, M.C., "Diffraction Gratings", *Academic Press, INC.* (London), 1982, pp. 94–125.

Ishihara, S., "The Effect Of Rubbed Polymer Films On The Liquid Crystal Alignment", *Liquid Crystals*, 1989, vol. 4, No. 6, pp. 669–675.

Jones, J.C., "The Relationship Between The Smectic Director And Layer Profiles And The Surface Anchoring Energies", *Ferroelectrics*, vol. 178, 1996, pp. 155–165.

Loewen, Erwin G., et al., "Large Diffraction Grating Ruling Engine With Nanometer Digital Control System", *SPIE vol. 815 Application and Theory of Periodic Structures, Diffraction Gratings, and Moire Phenomena III* (1987), pp. 88–95.

Rapini, A., "Umbilics: Static and Dynamic Properties", Colloogue C1, Supplement of No. 3, vol. 36, Mar., 1975, pp. C189–C196.

Schadt, Martin, et al., "Surface–Induced Parallel Alignment of Liquid Crystals by Linearly Polymerized Photopolymers", *Jpn. J. Appl. Phys.*, vol. 31 (1992), pp. 2155–2164.

Vetter, P., et al., "Memory Alignment Of Nematic Liquid Crystals On Polymer Coatings Without Rubbing Treatment", *Proc. Of Euro Display Conf, '93*, 1993, pp. 9–12.

* cited by examiner

LIQUID CRYSTAL DEVICE ALIGNMENT

This invention relates to liquid crystal device alignment.

Liquid crystal devices typically comprise a thin layer of a liquid crystal material contained between cell walls or substrates. Optically transparent electrode structures on the walls allow an electric field to be applied across the layer, causing a re-ordering of the liquid crystal molecules.

Many different modes of liquid crystal devices are known in the art, for example the twisted nematic device the cholesteric phase change device, the dynamic scattering device, the supertwisted nematic device and the surface stabilised ferroelectric device modes. It is well known in all of these device modes to provide a surface on the interior walls of the device which will control the alignment of the liquid crystal fluid in close proximity to the surface. For many applications of liquid crystal devices, such a treatment is considered necessary in order to impose a particular configuration on the alignment of the liquid crystal fluid throughout the device and/or to provide an optical appearance in the device which is free of apparent optical defect. The particular significance of this factor for different classes of liquid crystal device is described in greater detail below.

The terms azimuth or azimuthal is used hen in to define the molecular (or director n) alignment angle movement or energy in the plane of the substrate surface. The terms zenith or zenithal is used herein to define the molecular alignment angle movement or energy in a plane normal to the substrate surface.

In respect of use of nematic and long pitch cholesteric materials for devices known as twisted nematic liquid crystal devices, the relevance of alignment and the problems associated therewith are as follows.

In order to provide displays with a large number of addressable elements it is common to make the electrodes as a series of row electrodes on one wall and a series of column electrodes on the other cell wall. These form typically an x,y matrix of addressable elements or pixels and for twisted nematic types of device are commonly addressed using rms addressing methods.

Twisted nematic (TN) and phase change devices are switched to an ON state by application of a suitable voltage and allowed to switch to an OFF state when the applied voltage falls below a lower voltage level, i.e. these devices are monostable. For a twisted nematic type of device (90° or 270° twist as in U.S. Pat. No. 4,596,446) the number of elements that can be rms addressed is limited by the steepness of a device transmission verses voltage curve (as described by Alt and Pleschko in IEEE Trans ED vol ED 21, (1974) P.146–155). One way of improving the number of pixels is to incorporate thin film transistors adjacent to each pixel; such displays are termed active matrix displays.

An advantage of nematic types of devices is the relatively low voltage requirements. They are also mechanically stable and have a wide temperature operating range. This allows for the construction of small and portable battery powered displays. An alternative twisted nematic device is one which is switched from a non-twisted state at zero volts to a twisted state at a higher voltage, as described in GB 9607854.8, which will be referred to in this patent as a VCT device.

One problem with the twisted nematic device is that the contrast ratio of a normally white display remains at a low value until the voltage is increased to a value considerably higher than the threshold voltage. This is due to the nematic material close to the cell walls which does not fully reorient in the applied field due to the strong zenithal anchoring imposed by the surface alignment layer. This lack of surface reorientation also leads to higher voltage operation in the VCT device.

In respect of use of nematic and long pitch cholesteric materials for devices known as bistable nematic liquid crystal devices, the relevance of alignment and the problems associated therewith are as follows.

As described above, twisted nematic and phase change type of liquid crystal devices are switched to an ON state by application of a suitable voltage, and allowed to switch to an OFF state when the applied voltage falls below a lower voltage level, i.e. these devices are monostable. An advantage of nematic type of devices is that they have relatively low voltage requirements. They are also mechanically stable and have wide temperature operating ranges. This allows for the construction of small and portable battery powered displays. A disadvantage of such devices is that their monostable switching characteristic limits the number of lines that can be multiplex addressed.

Another way of addressing large displays is to use a bistable liquid crystal device. Ferroelectric liquid crystal displays can be made into bistable devices with the use of smectic liquid crystal materials and suitable cell wall surface alignment treatment. Such a device is a surface stabilised ferroelectric liquid crystal device (SSFELCDs) as described by:- L J Yu, H Lee, C S Bak and M M Labes, Phys Rev Lett 36, 7, 388 (1976); R B Meyer, Mol Cryst Liq Cryst. 40, 33 (1977); N A Clark and S T Lagerwall, Appl Phys Lett, 36, 11, 899 (1980). One disadvantage of ferroelectric devices is the relatively large voltage needed to switch the material. This high voltage makes small portable, battery powered displays expensive. Also these displays suffer from other problems such as lack of shock resistance, limited temperature range and also electrically induced defects such as needles.

If a bistable switching characteristic can be achieved using nematics then a display can be made which has the merits of both the above mentioned technologies but without their problems.

It has already been shown by Durand et al that a nematic can be switched between two alignment states via the use of chiral ions or flexoelectric coupling: A Charbi, R Barberi, G Durand and P Martinot-Largarde, Patent Application No WO 91/11747, (1991) "Bistable electrochirally controlled liquid crystal optical device", G Durand, R Barberi, M Giocondo, P Martinot-Largarde, Patent Application No WO 92/00546 (1991) "Nematic liquid crystal display with surface bistability controlled by a flexoelectric effect".

U.S. Pat. No. 4,333,708 describes a multistable liquid crystal device in which cell walls are profiled to provide an array of singular points. Such substrate configurations provide multistable configurations of the director alignments because disclination must be moved to switch between stable configurations. Switching is achieved by application of electric fields Patent Application No:. WO97/14990, (PCT-96/02463, GB95 21106.6) describes a bistable nematic device having a grating surface treatment to at least one cell wall that permits nematic liquid crystal molecules to adopt either of two pretilt angles in the same azimuthal plane. The cell can be electrically switched between these two states to allow information display which can persist after the removal of power.

Another bistable nematic device is described in GB.2, 286,467-A. This uses accurately formed bigratings on at least one cell wall. The bigrating permits liquid crystal molecules to adopt two different angular aligned directions when suitable electrical signals are applied to cell electrodes e.g. dc coupling to flexoelectric polarisation as described in Patent Application No. WO.92/00546. Since in the two splayed states the director is quite close to being in the plane of the layer, the coupling between director and flexoelectric component can be small, which may hinder switching in some circumstances.

The bistable nematic device of GB2286467-A also has a further problem which is not present in ferroelectric devices, that is, the need to switch the surface layer of molecules in order to eliminate image sticking effects. Surface layer switching usually requires high voltages which leads to both high power consumption and the need for customised driver circuitry.

In respect of devices using smectic materials, the relevance of alignment and the problems associated therewith are as follows.

There are a number of devices based on smectic liquid crystal materials including:

A: Ferroelectric liquid crystals (usually SMC*).

One example of this is bistable, and is often termed a surface stabilised FLC device (SSFLC ref. N. A. Clark and S. T. Lagerwall, Appl. Phys. Lett., 36, 899 (1980). In this device planar aligned surfaces are arranged with parallel or anti parallel preferred alignment directions. The device is cooled from an overlying Smectic A phase into a bookshelf arrangement of the smectic layers, that is the material forms into micro layers arranged normal to the cell walls as in books on a shelf.

In the original teaching, the device used an unrubbed polymer surface alignment treatment to ensure the liquid crystal director n lies preferentially and substantially parallel to the surface plane (i.e. ⊥ to s, the surface normal). A preferred direction was then imparted by heating to the smectic A phase and shearing the layers in the required direction. The layers remained fixed on cooling into the SmC* phase. The surface energy is minimum for n ⊥ s so that two minimum energy states occur which can be selected by a suitable DC electric field.

Bradshaw and Raynes realised that improved SmA alignment for such a device resulted by having a chiral nematic N* phase above the SmA in which the pitch was sufficiently long for the surface forces to cause unwinding of the spontaneous helicity for a significant temperature range above the transition. They also required that the surface should be pre-treated to impart the preferred directions, often by use of parallel or antiparallel rubbing of a polyimide or polyamide layer; GB-2,210,469 U.S. Pat. No. 4,997,264, GB-2,209,610, U.S. Pat. No. 5,061,047, GB-2,210,468.

Later it was found that when a bookshelf aligned (where the layer normal is parallel to the plane of the dance i.e. $\delta=0$) SmA sample is cooled into the SmC* phase, the layers become tilted in a chevron type of configuration; two type of chevron can exist and are defined as $C_1$ and $C_2$ type (ref J. Kanbe et al Ferroelectrics (1991) vol 114, pp3). These are shown in FIG. 18. This has been ascribed to the combined effect of shrinkage of the smectic layer spacing and pinning of the layers at the surface. The resulting chevron structure means that the director in the middle of the cell is (roughly) fixed in one of two orientations significantly less than the full cone angle. This means that with no applied field there is a substantial drop in the angle between the optic axis of the two "surface stabilised" states which leads to a corresponding drop of the display brightness. A number of methods of improving the optical brightness have been proposed for practical devices:

1. AC field stabilisation:

An applied AC field pulse of insufficient time and voltage ($\tau$ V) to latch into the two states couples to the dielectric tensor (primarily the dielectric biaxiality) to increase the angle between these states and enhance the brightness. The main problem with this type of approach is that a high frequency voltage is constantly required to maintain the required brightness. This causes a high power dissipation, particularly for complex displays where the applied frequency is high. Usually the brightness is compromised by using a suitably low AC voltage. It has the advantage that, if C2U type alignment is used, there is no need for surface switching, and hence surface memory effects are minimal, and the slower switching at the surface does not affect the device.

2 High pre-tilt Parallel:

This geometry has (approximately) the same chevron structure with the director at the chevron interface also at a low angle to the rubbing direction. However, the director at the surface is at a much higher in-plane twist angle due to the competing effects of lying on the SmC* cone and with the preferred alignment pre-tilt. This type of device gives good brightness but suffers from a slower response since it involves surface switching, and from strong surface memory problems which may lead to image sticking.

3 Quasi-bookshelf:

Two methods may be used to reduce the layer tilt angle and thereby increase the device brightness. Pre-treating the device with a low frequency field of sufficient magnitude or choosing certain materials in which the layer shrinkage on cooling through the smectic phases is reduced (some materials may actually increase layer spacing on cooling). Such a device has similar advantages and disadvantages to the high pre-tilt configurations.

4 Uniform Tilted layer (High pre-tilt anti-parallel) geometry:

Similar to the previous two geometries, but there is no chevron (and therefore no constraint on the director at the cell centre) and the high angle between the bistable states is stabilised solely by the surfaces.

B: Electro-clinic optical shutters:

Application of a DC field to the smectic A (or other orthogonal smectic) phase of a chiral material leads to an induced tilt of the director and hence optical axis normal to the applied field. In a (approximately) planar aligned liquid crystal cell with electrodes on the substrate surfaces the electroclinic effect induces a rotation of the optic axis by an angle proportional to the applied field E. Thus, an optical shutter with full analogue amplitude or phase modulation may be obtained.

A common problem with such a device is obtaining suitably uniform and planar alignment of the smectic layers. A lesser problem is that the induced switching may involve some rotation of the director away from the preferred alignment direction at the surface. This movement is subject to a surface viscosity which may impede the switching time of the device and also to certain surface memory effects.

C: Anti-ferroelectric smectic liquid crystals (AFLC):

Certain materials form an anti-ferroelectric phase which may be used in active matrix or direct drive devices. Effectively these devices have a similar appearance to the smectic A phase until sufficient DC voltage is applied, above which the sample is in either of two states (depending on the polarity of the applied signal) similar to the normal ferroelectric phase.

There is a limited number of materials which form this phase (particularly over a wide temperature range) and all those found so far have direct isotropic to smectic phase (i.e. no overlying chiral nematic phase). This means that the materials are more difficult to align, forming batonnets (see Gray and Goodby book) of the smectic at this transition.

The mechanism for this is that the smectic layer structure nucleates in a limited number of "cold spots" in the isotropic liquid. The layers then curve around this point to minimise the bend and splay of the layer normal. Where the layers meet the surface they become pinned and difficult to move. Hence, it is difficult to obtain the desired layer arrangement (e.g. planar or bookshelf) once the batonnet structure has pre-formed. On cooling into the AFLC phase, the applied field tends to induce twist of the director at the surfaces which also leads to problems associated with surface switching such as slower speed, surface memory effects, etc.

D: SmC* Optical Shutters:

Bradshaw and Raynes also described a type of device in which the FLC is obtained from cooling directly from the unwound No phase in a parallel rubbed device, preferably within applied DC field applied during the phase transition. The unwound N* phase has the director in the rubbing directions and on cooling into the SmC* this orientation is maintained and the layer normal twists through the angle θ. Degeneracy of the direction in which the layer normal is oriented is removed by the application of the DC field.

This is a monostable device, since it always relaxes back to the surface stabilised state (with n ∥ s) once the field is removed (it may be used in devices when the field is retained, either through AC stabilisation or through inclusion of TFTs or similar non-linear electrical elements at each pixel. However, it is fist (due to Ps). Primarily, switching occurs in the bulk of the cell and little or no switching occurs at the surface. However, this means that the director is highly twisted and non uniform in structure. This means that the optical appearance is poor (particularly if used in conjunction with a dye as done in early Hitachi work) and so this is a case where surface switching is required to improve performance. Also, alignment is difficult over a wide temperature range because layer shrinkage still occurs in many N-SMC* materials, leading to a chevron structure and associated defects.

Alignment of liquid crystals on a surface is therefore a significant problem for all these device types. Several different means are known by which liquid crystal fluids may be aligned on a surface. Evaporation of silicon monoxide from a direction at least 30° from the plane of the substrate provides a surface which aligns a nematic liquid crystal in the plane of the substrate, along an axis orthogonal to the evaporation direction. In contrast, if the evaporation is conducted from a direction making an angle of about 5° or less from the substrate, the resulting surface aligns a nematic liquid crystal along a direction tilted from the plane of the substrate by about 20° in the direction of the evaporation source.

Many commercial liquid crystal devices are fabricated using rubbed polymer alignment layers, especially rubbed polyimide alignment layers. Typically such layers are deposited as an amide precursor polymer by spin deposition of a solution. After removal of the solvent, the polymer coating is imidised by baking at high temperature, then unidirectionally nibbed with a cloth. The resulting surface aligns liquid crystal materials along the direction of rubbing with a tilt out of the plane of the surface in the direction of rubbing. The magnitude of the tilt angle is typically 1° to 2°, but special polyimide formulations and treatments are available which can provide higher magnitudes of pretilt. Some polymer layers are capable of aligning liquid crystal material when cross linked by exposure to linear polarised light (WO95/22075, GB-9444402516). This avoids the need for rubbing which is useful when substrates carry thin film transistors for a part of active matrix displays. The aligned polymer may also be used in conjunction with gratings as noted below.

A further means to provide a surface alignment for liquid crystal materials is available from the deposition of different surfactant materials onto the substrate from solution. A range of different surfactants may be used, including quaternary ammonium salts, alkylated silazenes and basic chromium alkanoates. Treatment of the surface usually entails dipping or spin coating with a dilute solution of the surfactant, and usually results in an alignment of the liquid crystal orthogonal to the plane of the substrate, termed homeotropic alignment. Binuclear chromium alkanoates and other binuclear surfactants may provide alignment in the plane of the substrate without any preferred direction in this plane.

Yet, a further method to achieve liquid crystal alignment at a surface involves fabrication of a relief structure such as a relief grating on the surface. Such a structure may be obtained by photolithographic means, by embossing a compliant surface layer such as a polymer against a master structure fabricated on, for example, a metal sheet, by mechanically scribing the surface or by other means. A grating structure aligns a nematic liquid crystal along the direction of the troughs and crests of the grating. More complex relief structures can provide tilted or bistable alignment.

The alignment methods of the known art suffer a number of shortcomings which prevent liquid crystal devices manufactured according to these methods from achieving their full potential utility.

One such shortcoming is that it is hardly possible according to known methods, to provide a surface alignment treatment on which the liquid crystal alignment is free to adopt any alignment direction in the plane of the surface. A planar alignment may be obtained by various methods including evaporation of an inorganic material from substantially normal incidence to the substrate, or by coating the substrate with a known polymer material such as a polyimide material without mechanical rubbing. In these cases, the alignment of the liquid crystal on the surface is not fixed during the surface preparation, but is fixed by the alignment of the liquid crystalline phase which first contacts it, and then becomes immovable.

On such a surface the alignment direction is determined by such factors as the flow direction or the direction of a temperature gradient or electric fields at the time the liquid crystal phase first contacts the surface. It is desirable to provide a surface treatment which can allow the liquid crystal alignment direction to rotate freely and repeatedly in the surface plane, but this is not available from known surface treatments.

A second shortcoming of known liquid crystal alignment techniques is that the energy required to change the zenithal angle between the substrate and the liquid crystal director is much greater than the elastic distortion energy of the liquid crystal itself which is generated by commonly applied voltages. This means that in liquid crystal devices using known alignment techniques, the liquid crystal director remains substantially fixed in tilt angle at the cell walls and the switching of the device which provides an optical effect occurring only in the parts of the device which are separated from the cell walls by some distance which depends on the magnitude of the applied field.

The present inventors have found that the above problems are reduced by a surface alignmlent treatment which allows movement of liquid crystal molecules at or close to the cell walls, hence the liquid crystal director is in contact with the wall to reversibly change its orientation at low values of applied field, for example at applied field strengths of the order of less than 1 volt per micron for an applied electric field. The benefits of such a surface treatment may include reduction in the operating voltage of the device and/or an improvement in the switching behaviour of the device such as the electro-optic threshold steepness of the device which determines the amount of information which may be written on an electro-optic display by means of the known methods of RMS multiplex driving.

Accordingly, in a first aspect the invention provides a liquid crystal device comprising a layer of a liquid crystal material contained between two spaced cell wall carrying electrodes structures and an alignment treatment on at least one wall, characterised by means for reducing anchoring energy at the surface alignment on one or both cell walls.

The anchoring energy reduced is one or more of azimuthal anchoring energy, zenithal anchoring energy, and translational anchoring energy (movement along the alignment treated surface). The significance of anchoring energies in the context of different device types are discussed further below. Further aspects of the invention relevant to specific device types are also discussed further below.

Anchoring energy arises from surface topography features such as grooves or gratings, and from chemical bonding interactions. The present invention reduces anchoring energy by changing the chemical bonding. Additionally the surface topography may also be changed, for example to reduce the dimensions of grooves or gratings. The means for reducing energy may be an oligomer or short chain polymer which is either spread on the surface or added to the liquid crystal material. The size of oligomer or short chain polymer may be selected to give a desired amount of preferential deposition at cell walls and slight separation from the liquid crystal material host.

The means for reducing anchoring energy may be an oligomer containing esters, thiols, and/or acrylate monomers and or which is either spread on the surface or added to the liquid crystal material.

The alignment treatment and means for reducing anchoring energy may be provided by a double layer treatment, now referred to as a substrate layer and a polymer layer. The substrate layer may either be formed in the surface of the cell wall, e.g. by mechanical rubbing of the surface, or (and preferably) be a coating on the cell wall. This coating may include anisotropic features which act to align liquid crystal phases placed in contact with it or in close proximity to it. Such features may include surface relief features including a plain or blazed grating or bigrating structure, or a regular or irregular array of surface features including but not limited to columns, tilted columns, platelets and crystallites e.g. formed by normal or oblique evaporation of inorganic materials onto the surface or by mechanical abrasion or working of the surface. Such features may also include a substantial anisotropy in the substrate formed, for example, by mechanical stretching or rubbing of the substrate layer or by exposure of the substrate layer to polarised actinic radiation.

The polymer layer (formed on the substrate layer) has the characteristics of having imperfect solubility in the liquid crystal material used in the device, of having a physical affinity for the surface of the substrate, and of retaining a substantially liquid like surface at the polymer/liquid crystal interface.

The polymer may be applied to the device in various ways. In one approach, the polymer is formed by polymerisation of reactive low molecular weight materials in solution in the liquid crystal fluid. The resulting solution or dispersion of polymer in liquid crystal is then filled into the cell, and the polymer is allowed to coat the substrate surfaces. Optionally, the dispersion of polymer in liquid crystal may undergo intermediate processes such as filtration or centrifuging prior to being filled into the display cell.

In a further approach to applying the polymer to the device the reactive low molecular mass materials may be dissolved into the liquid crystal which is then filled into the display cell. Polymerisation is then initiated by known means, such as by heating or exposure to short wavelength optical radiation in the presence of an initiator. After polymerisation the polymer is allowed to diffuse to and coat the substrate layers.

A still further approach to applying the polymer to the device is provided by polymerisation of the reactive materials in the presence or absence of an inert solvent. The solvent, if present, is removed and the resulting polymer is dissolved in the liquid crystal and filled in to the display cell.

A further approach to applying the polymer to the device is to form the polymer on the substrate by applying a thin layer of reactive low molecular weight materials to the substrate by known means such as by spinning a stoichiometric amount of each onto the substrate in solution in a solvent. After removal of the solvent, polymerisation is initiated by heating or by exposure to light in the presence of a polymerisation initiator. The treated substrates are then assembled into a cell and the liquid crystal added in.

The polymer is characterised in that it is substantially non-crystalline in the presence of the liquid crystal, and that it possesses a glass transition temperature below the operating temperature range of the device. The polymer may be substantially linear in its molecular structure or it may include branch points. The polymer may also be crosslinked to a low degree in order to promote phase separation from the liquid crystal and deposition onto the substrate, but such crosslinking is at such a level that a fluid, gum-like, gel-like or elastic character is retained, and the polymer does not present a hard glassy or solid like character which is retained on heating.

Preferred polymeric materials include thiol/ene polymers prepared by free radical polymerisation of known monomers in the presence of an added thiol compound which serves to limit the molecular weight of the product through chain transfer reactions. Details of suitable material are listed later.

In relation to twisted nematic devices, the present inventors have found that the contrast ratio of a twisted nematic device can be improved by using an additional a surface treatment which reduces the zenithal anchoring energy of the surface and thereby allows field-induced reorientation of the near-surface nematic layers. Such a treatment also has the added advantage of leading to a lowering of the threshold voltage. Lower voltage operation is preferable for both passive matrix and active matrix twisted nematic devices as it allows a display to operate with a lower power consumption.

Accordingly, in a second aspect the invention provides a twisted nematic liquid crystal device capable of being switched from a twisted state to a non twisted state comprising; two cell walls enclosing a layer of nematic liquid crystal material; electrode structures on both walls for applying an electric field across the liquid crystal layer; a surface alignment on both cell walls providing alignment direction to liquid crystal molecules and arranged so that a twisted nematic structure is formed across the liquid crystal layer at either zero volts or at a higher voltage; means for distinguishing between the two different optical states of the liquid crystal material; CHARACTERISED BY means for reducing zenithal anchoring energy in the surface alignment on one or both cell walls.

Additionally the azimuthal anchoring energy may also be reduced.

The means for reducing azimuthal anchoring energy and zenithal anchoring energy may be an oligomer containing esters, thiol, and/or acrylate monomers either spread on the surface or added to the liquid crystal material, e.g. the materials N65 and MXM035.

The oligomers may migrate preferentially to the surface in order to minimise the surface free energy. This may dilute the amount of liquid crystal at the surface leading to an effective reduction in the order parameter, S which is defined by (P. G. deGennes, The Physics of Liquid Crystals, Clarendon Press, Oxford 1974):

$$S = \frac{1}{2} \langle (3\cos^2\theta - 1) \rangle$$

The order parameter is an indication of how well molecules align in a cell. Additionally the phase of the liquid crystal material at the surface may be changed by the oligomers, e.g., from nematic or long pitch cholesteric to isotropic.

The treatment may be used in conjunction with a surface which induces monostable pretilted nematic alignment.

The alignment layer may be a rubbed polymer surface as described in S. Ishihara et al., Liq. Cryst, vol.4, no. 6. p.669–675 (1989) or an obliquely evaporated inorganic material as described in W. Urbach, M. Boix, and E Guyon, Appl. Phys. Lett., vol. 25, no. 9, 479 (1974) or a polymer surface where in-plane anisotropy is achieved by illumination with polarised light such as M. Schadt et al., Jpn. J. Appl. Phys., v. 31, no.7, p.2155 (1992).

Alternatively, the alignment layer may be a surface-monograting with an asymmetric groove profile as described in G. P. Bryan-Brown and M. J. Towler, "Liquid crystal device alignment", GB 2,286,466A (GB9402492.4).

The alignment directions on the two surfaces may be substantially perpendicular.

The nematic liquid crystal may contain a small amount (<5%) of a chiral dopant material e.g., R1011, CB15 Merck.

The cell walls may be substantially rigid e.g., glass material, or flexible e.g., polyolefin.

The electrodes may be formed as a series of row and column electrodes arranged and an x,y matrix of addressable elements or display pixels. Typically, the electrodes are 200 μm wide spaced 20 μm apart.

Alternatively, the electrodes may be arranged in other display formats e.g., r-θ matrix or 7 or 8 bar displays.

In relation to bistable nematic devices, the present inventors have found that the problem of surface layer switching is reduced by using a surface treatment which changes the liquid crystal properties in the vicinity of the surface and so leads to a lower anchoring energy between the liquid crystal and the surface. This allows lower voltage operation without compromising other device parameters.

Accordingly, in a third aspect the invention provides a bistable nematic liquid crystal device which comprises; two cell walls enclosing a layer of nematic liquid crystal material; electrode structures on both walls; a surface alignment on both cell walls providing alignment direction to liquid crystal molecules; means for distinguishing between switched states of the liquid crystal material; CHARACTERISED BY means for reducing inelastic azimuthal memory anchoring energy in the surface alignment on one or both cell walls.

Ideally, the inelastic azimuthal memory anchoring energy is reduced to zero. Preferably, the zenithal anchoring energy is also reduced.

The means for reducing energy may be an oligomer or short chain polymer which is either spread on the surface or added to the liquid crystal material.

Preferably, the oligomer or short chain polymer does not change the pretilt by a substantial amount, e.g., change the pretilt by more than 5°.

The treatment is used in conjunction with a surface which induces bistable nematic alignment.

The bistable surface may be a surface alignment bigrating on at least one of the cell walls that permits the liquid crystal molecules to adopt two different azimuthal alignment directions, as in patent application WO097/14990, (PCT-96/02463, GB95 21106.6).

The angle between the alignment directions may be 90° or less than 90°.

The grating may be a profiled layer of a photopolymer formed by a photolithographic process, e.g., M C Hutley, Diffraction Gratings (Academic Press, London 1982) p 95–125; and F Horn, Physics World, 33. (Mach 1993). Alternatively, the bigrating may be formed by embossing; M T Gale, J Kane and K Knop, J App. Photo Eng, 4, 2, 41 (1978), or ruling; E G Loewen and R S Wiley, Proc SPIE, 88 (1987), or by transfer from a carrier layer.

The bigrating may have a symmetric or asymmetric groove profile. In the latter case the surface induces both alignment and pretilt as described in GB2286467-A.

The gratings may be applied to both cell walls and may be the same or a different shape on each wall.

The bistable surface could alternatively be formed by using an obliquely evaporated material as described in patent Application WO 92/0054 (G Durand, R Barberi, M. Giocondo and P Martinot-Largarde, 1991).

The cell walls may be substantially rigid, e.g., glass material, or flexible e.g., polyolefin.

The electrodes may be formed as a series of row and column electrodes arranged and an x,y matrix of addressable elements or display pixels. Typically, the electrodes are 200 μm wide spaced 20 μm apart.

Alternatively, the electrodes may be arranged in other display formats, e.g., r-θ matrix or 7 or 8 bar displays.

In relation to smectic devices, the inventors have found that problems in such devices may be reduced by use of a surfactant to lower the interaction between the surface(s) of cell wall(s) and the liquid crystal in the smectic phase, or in the overlying nematic phase from which the cell is cooled into the smectic phase for all operating temperatures. This use of a surfactant may be termed a slippery surface treatment. Thus, improved alignment, optical properties, switching speed, and stability to shock of smectic devices are achieved through slippery surface treatment.

Accordingly, in a fourth aspect, the invention provides a smectic liquid crystal device which comprises: a liquid crystal cell including a layer of smectic liquid crystal material contained between two walls bearing electrodes and surface treated to give both an alignment and a surface tilt to liquid crystal molecules; CHARACTERISED BY means for reducing anchoring energy at the surface alignment on one or both cell walls.

The means for reducing anchoring energy may be an oligomer containing esters, thiols, and/or acrylate monomers and or which is either spread on the surface or added to the liquid crystal material.

In its most elemental form the surfactant provides a slippery surface which reduces the interaction between the liquid crystal molecules and those of the surface of the cell wall (or alignment layer surface). Thus, the slippery surface may be thought of as having increased freedom for translational and rotational movement of the liquid crystal molecules closest to the surface. There are five surface terms (ref: Int Ferroelectric Liquid Crystal Conf(FLC95), Cambridge, UK, Jul. 23–27, 1995, vol.178 No.14 J. C. Jones, pp155–165) which are relevant and may be controlled by the surfactant:

(1) α, zenithal anchoring energy. How easily the director surface tilt angle is changed (i.e., a rotational energy).
(2) β, azimuthal anchoring energy—case of changing surface twist angle of director (i.e., a rotational energy).
(3) γ, related to the pretilt angle of the director at the surface.
(4) Layer pinning term—How easily layers may be moved across the surface (i.e. a translational energy). This is the macroscopic effect of the (partial) adsorption of liquid crystal molecules onto the surface layer reducing translational movement of the molecules and hence of the smectic layers.
(5) Polar surface energy—In ferroelectrics (or flexoelectrics) a term which is minimum for a particular orientation of the Ps at the surface.

In this aspect of the present invention each of these factors is influenced by the presence of a slippery surfactant which acts to separate the solid and liquid crystal regions by the induced changes of liquid crystal order close to the surface. For example, if nematic order exists close to the surface layer of a smectic device, then layer pinning is greatly reduced. If the cone angle is lower, surface switching is reduced, as well as the polar surface term.

Advantages provided by this aspect of the present invention are as follows:

(1) Reduced layer pinning hence control of the smectic layers is easier;
(2) Reduced nematic-like surface energies, hence orientation changes of the director at the surface are enhanced.
(3) Reduced adsorption of liquid crystal molecules at the surface, hence reduced surface memory effects and reduced surface viscosity;
(4) Reduced polarity of the surface, hence less coupling to the spontaneous polarisation coefficient (Ps) in ferro electric liquid crystal systems resulting in less T state formation.

Specific embodiments of the invention will be described below, by way of example, with reference to the accompanying drawings, in which.

Figure 13:
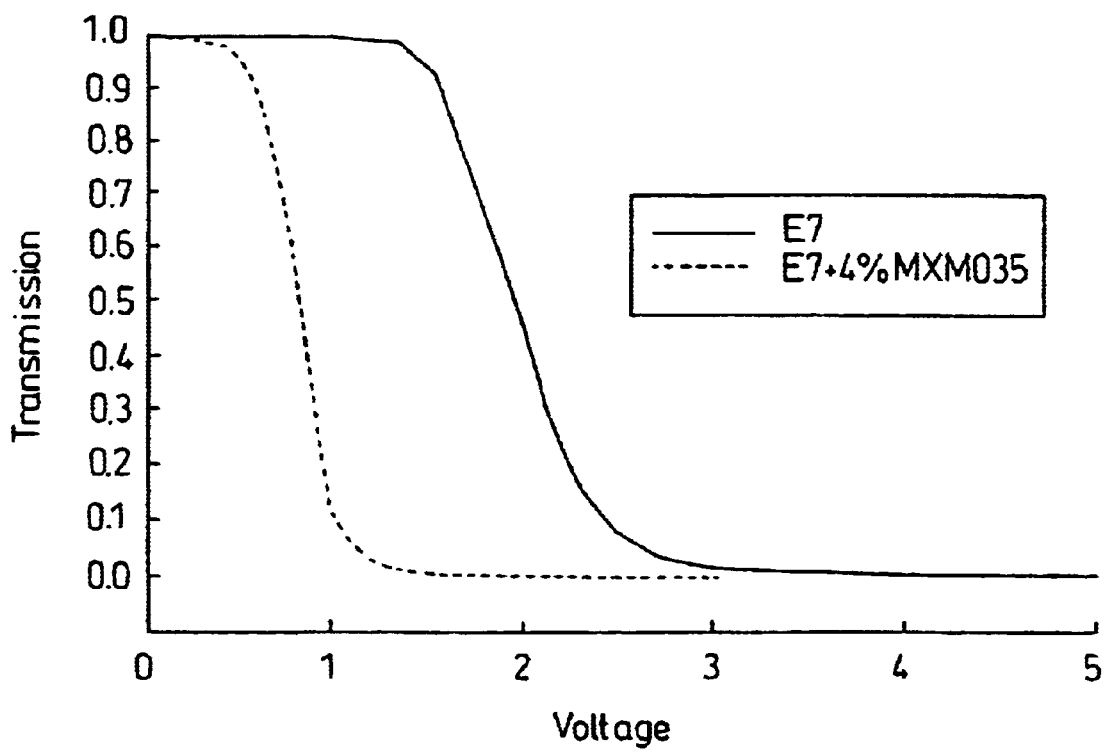

FIG. 13 shows the transmission versus voltage data for two cells, one of which (dotted line) has been treated with an additive (MXM035) to give weak anchoring. Gratings have been used on both surfaces for alignment. Cell gaps are 2.05 μm.

Figure 14:
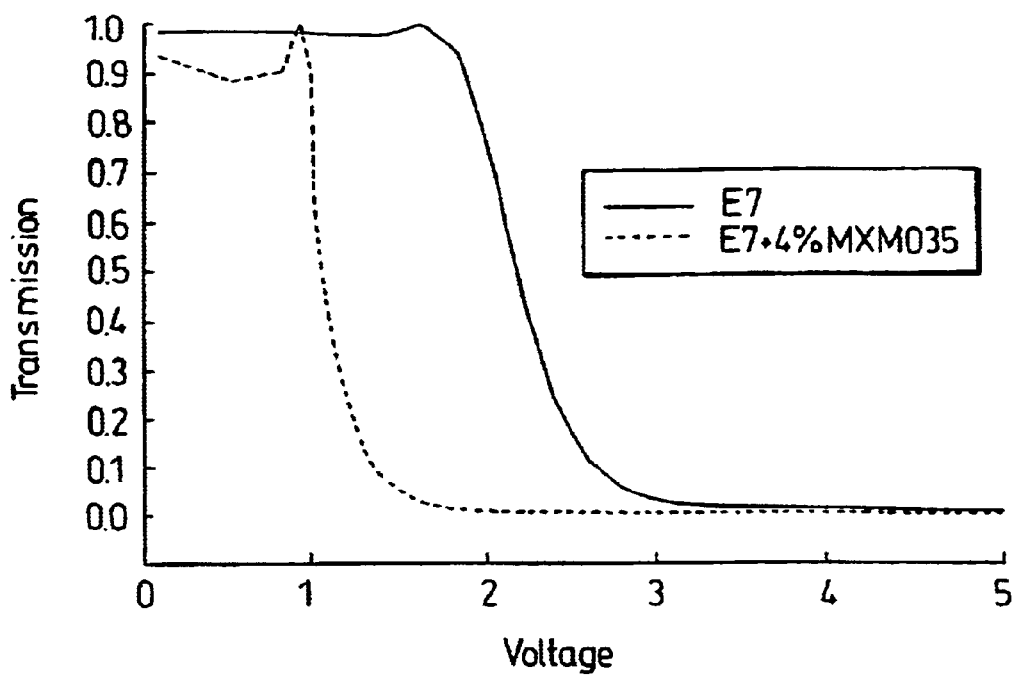

FIG. 14 shows the transmission versus voltage data for two cells, one of which (dotted line) has been treated with an additive (MXM035) to give weak anchoring. Gratings have been used on both surfaces for alignment. Cell gaps are 4.6 μm.

Figure 15:
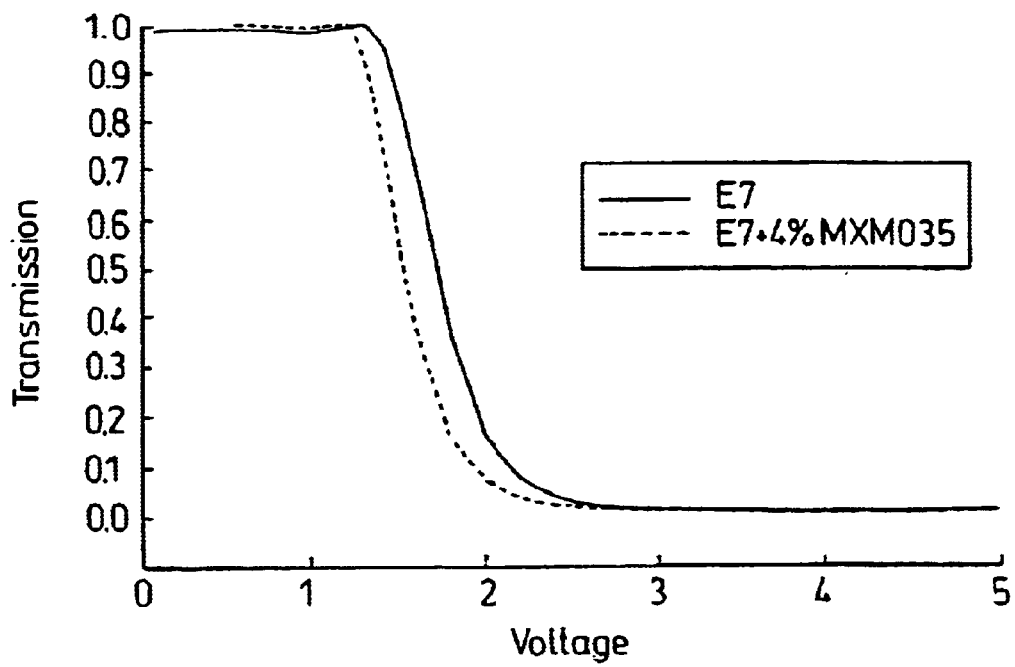

FIG. 15 shows the transmission versus voltage data for two cells, one of which (dotted line) has been treated with an additive MXM035) to give weak anchoring. Rubbed polymer layers have been used on both surfaces for alignment. Cell gaps are 4.6 μm.

Figure 16:
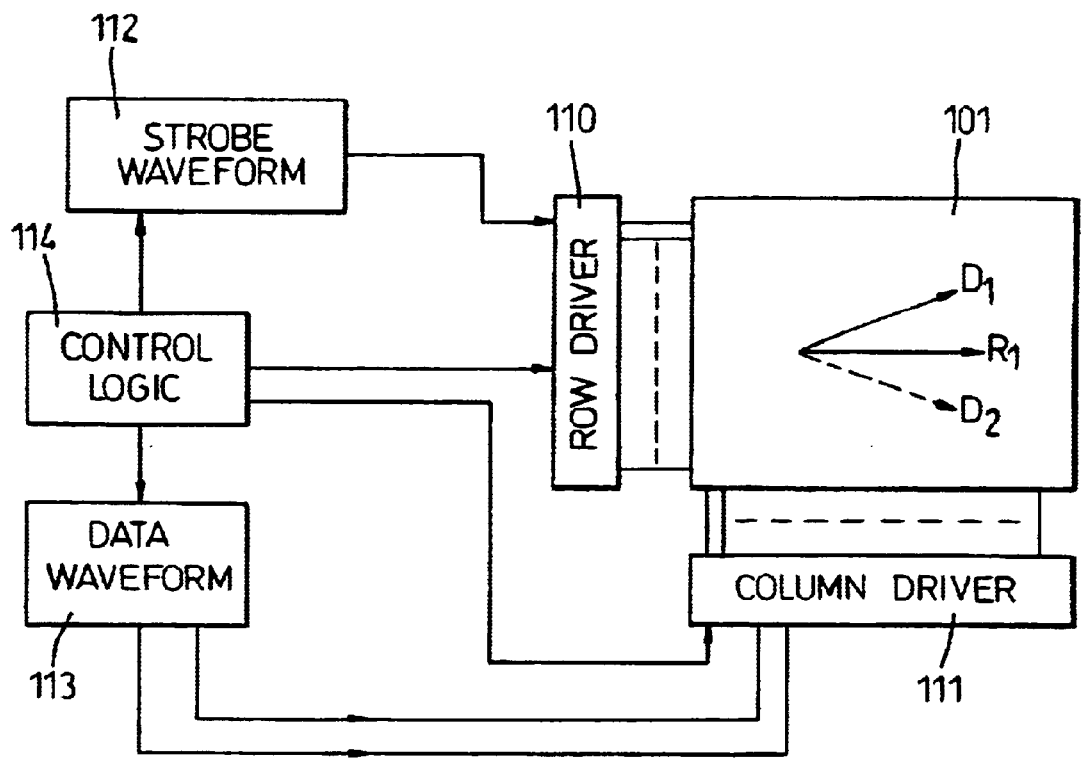

FIG. 16 is a diagrammatic view of a bistable ferro electric display with row and column drivers providing an x,y matrix display.

Figure 17:
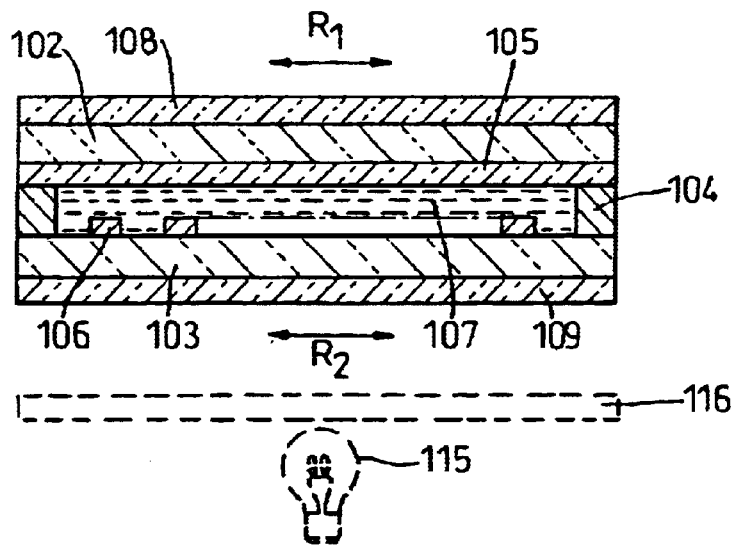

FIG. 17 is a cross section of the display cell of FIG. 16; and

Figure 18:
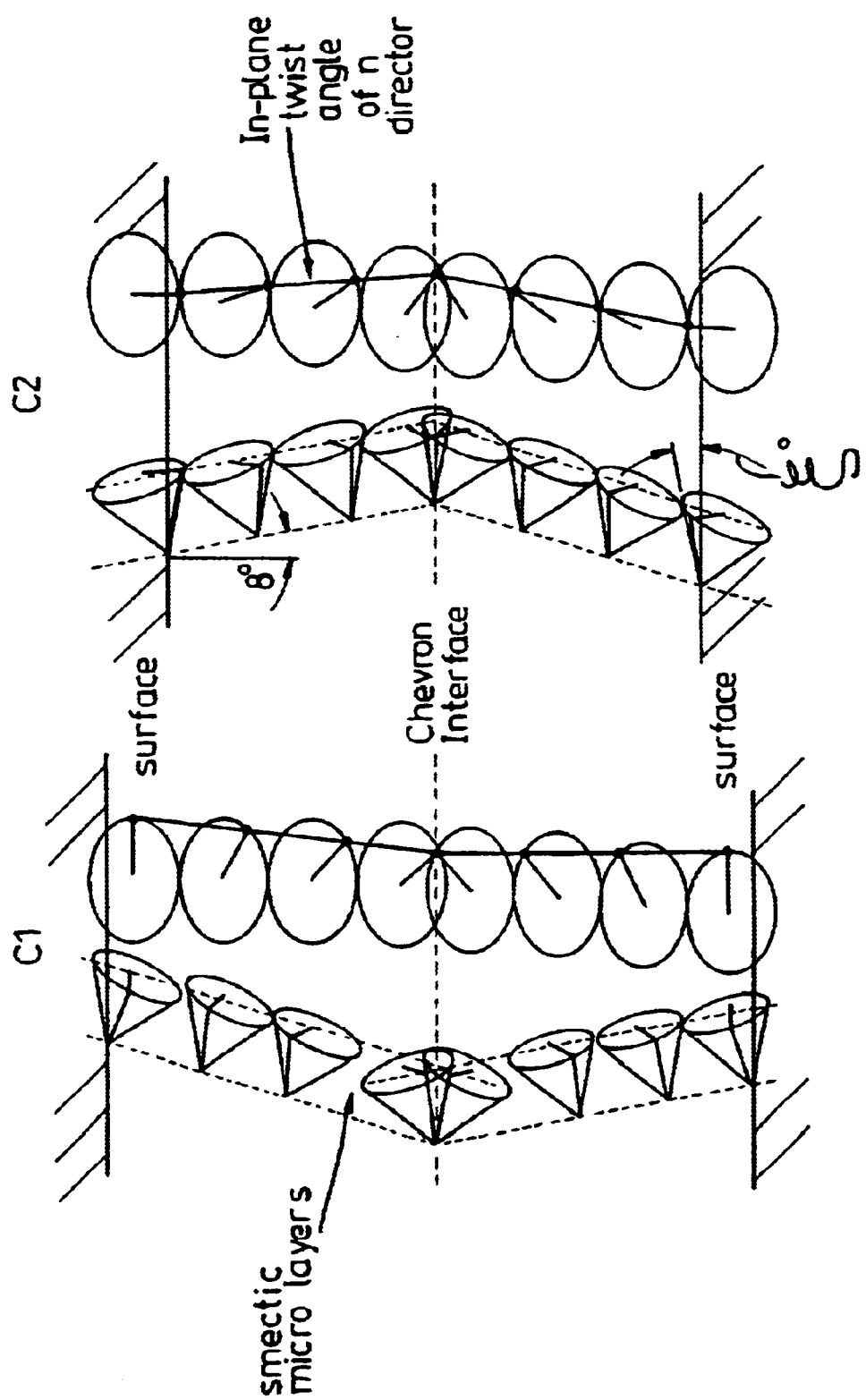

FIG. 18 is a schematic view of a layer of ferro electric liquid crystal material, showing two alignment configurations, the $C_1$ and the $C_2$ states.

The application of aspects of the present invention to twisted nematic, bistable nematic, and smectic devices will now be described in separate groups of examples.

Twisted Nematic Devices

Figure 1:
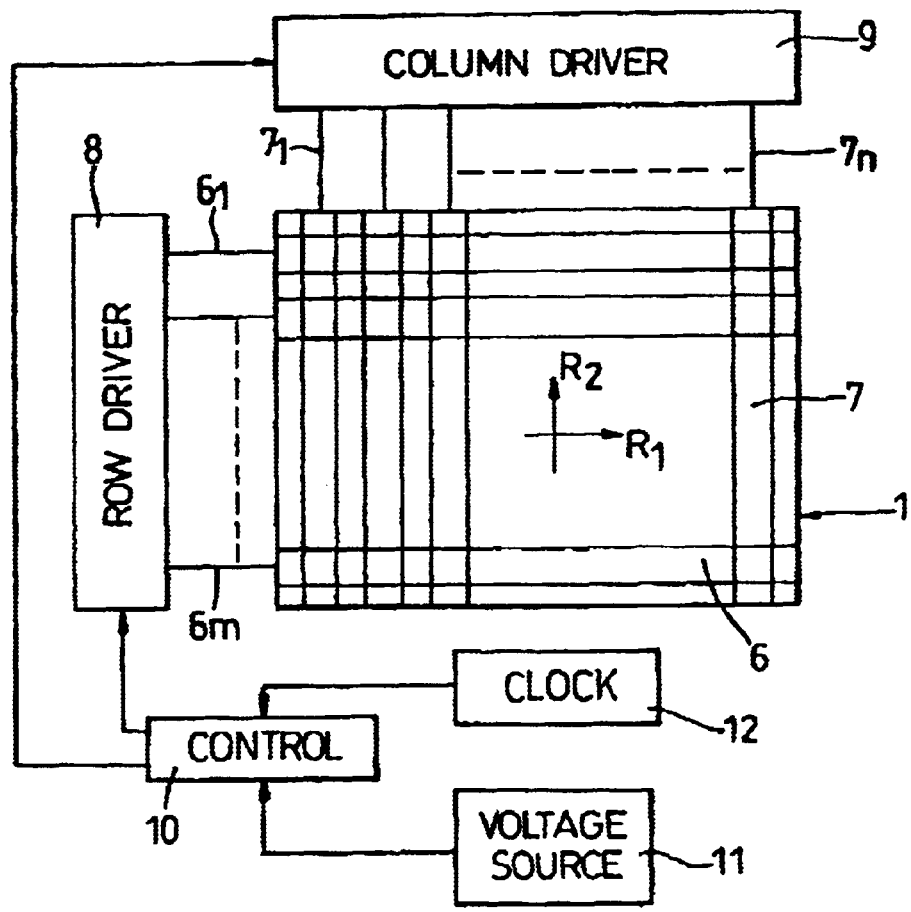
FIG. 1 is a plan view of a matrix multiplexed addressed liquid crystal display.
Figure 2:
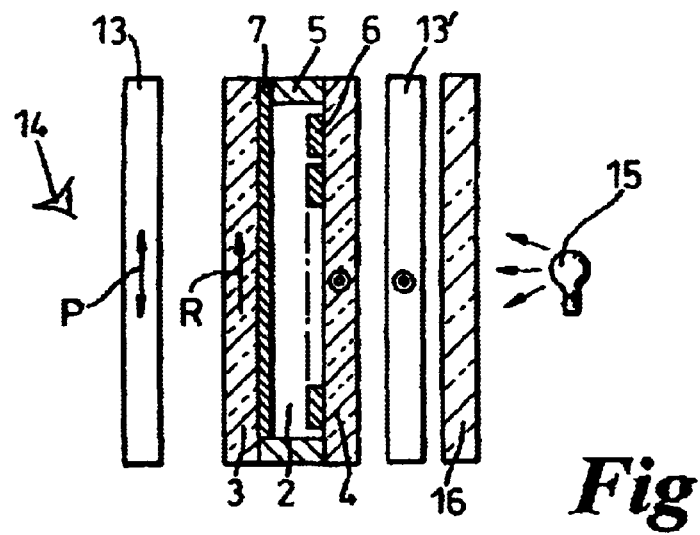
FIG. 2 is the cross section of the display of FIG. 1.

The display in FIGS. 1, 2 comprises a liquid crystal cell 1 formed by a layer 2 of nematic or long pitch cholesteric liquid crystal material contained between glass walls 3, 4. A spacer ring 5 maintains the walls typically 2–10 μm apart. Additionally, numerous beads of the same dimensions may be dispersed within the liquid crystal to maintain an accurate wall spacing. Strip like row electrodes 6 e.g., of $SnO_2$ or ITO are formed on one wall 3 and similar column electrodes 7 are formed on the other wall 4. With m-row and n-column electrodes this forms an m×n matrix of addressable elements or pixels. Each pixel is formed by the intersection of a row and column electrode. A row driver 8 supplies voltage to each row electrode 6. Similarly, column driver 9 supplies voltages to each column electrode 7. Control of applied voltages is from a control logic 10 which receives power from a voltage source 11 and timing from a clock 12.

On either side of the cell 1 are polarisers 13, 13' arranged with their polarisation axes substantially crossed with respect to one another. An additional optical compensator such as a stretched plastic film may also be added between the liquid crystal cell and one of the polarisers. A partly reflecting mirror 16 may be arranged behind the cell 1 together with a light source 15. These allow the display to be seen in reflection and lit from behind in dull ambient lighting. For a transmission device, the mirror may be omitted.

Prior to assembly, the cell walls 3, 4 are treated with alignment treatments to provide a monostable pretilted alignment. The alignment directions R1, R2 are shown as orthogonal to give a 90° or 270° twisted cell, but may be at other angles, e.g., at 45°. Finally, the cell is filled with a nematic material which may be e.g., E7, ZLI2293 or MLC 6608 (Merck), and may include a chiral additive such as CB15 or R1011 (Merck).

In use, the display may be multiplex addressed in a conventional manner by the application of a row waveform applied to each row in turn whilst applying waveforms to all columns. Such addressing is capable of applying two different rms value waveforms at each x,y intersection. One waveform has an rms value above a switching threshold and will therefore switch the liquid crystal material to an ON state. The other resultant waveform has an rms value below the switching threshold and therefore does not switch the liquid crystal material.

The number of x,y pixel elements that can be rms addressed is limited by the steepness of a device transmission verses voltage curve (as described by Alt and Pleshko in IEEE Trans ED vol ED 21, (1974) P.146–155). Therefore improvements to the steepness of the transmission—voltage curve are highly desirable. Additionally, if more of the material can be switched (switching the molecules adjacent a wall surface, rather than switching only at the layer centre) then a higher contrast between ON and OFF states would be obtained.

These nematic materials in embodiments of the invention contain the treatment or a precursor of the treatment which leads to a lowering of the anchoring energy.

In general, anchoring of a nematic liquid crystal on a surface can be described by three macroscopic parameters, pretilt, zenithal anchoring energy and azimuthal anchoring energy. Consider a surface in the x-y plane, parallel to the cell walls. The pretilt ($\theta_p$) is defined as the preferred angle of inclination of the nematic director with respect to the x-y plane. To change the tilt of the surface director from $\theta_p$ to an arbitrary tilt $\theta$; an energy per unit area of W must be supplied to the system where [A. Rapini and M. Papoular. J. Phys. (Paris), 36, C-1, 194 (1975)]:

$$W=W_\theta \sin^2(\theta-\theta_p) \quad (1)$$

$W_\theta$ is the zenithal anchoring energy and represents the energy required in order to change the tilt of the surface director by 90°. If the director has a preferred in-plane orientation, say along the x axis, then an energy must be supplied to the system to change this orientation. The energy is now given by $$W=W_\phi \sin^2\phi \quad (2)$$

where $\phi$ is the change in the in-plane orientation and $W_\phi$ is the azimuthal anchoring energy.

Pretilt and zenithal anchoring can be achieved from most solid surfaces while azimuthal anchoring usually requires some extra treatment in order to obtain a preferred in-plane direction such as an anisotropic polymer, obliquely evaporated film, or a surface grating. For most surfaces, $W_\theta$ end $W_\phi$ are large and so reorientation of the director at the surface only occurs at high voltages.

The effect of the weak zenithal anchoring on a twisted nematic device is discussed below.

Figure 3:
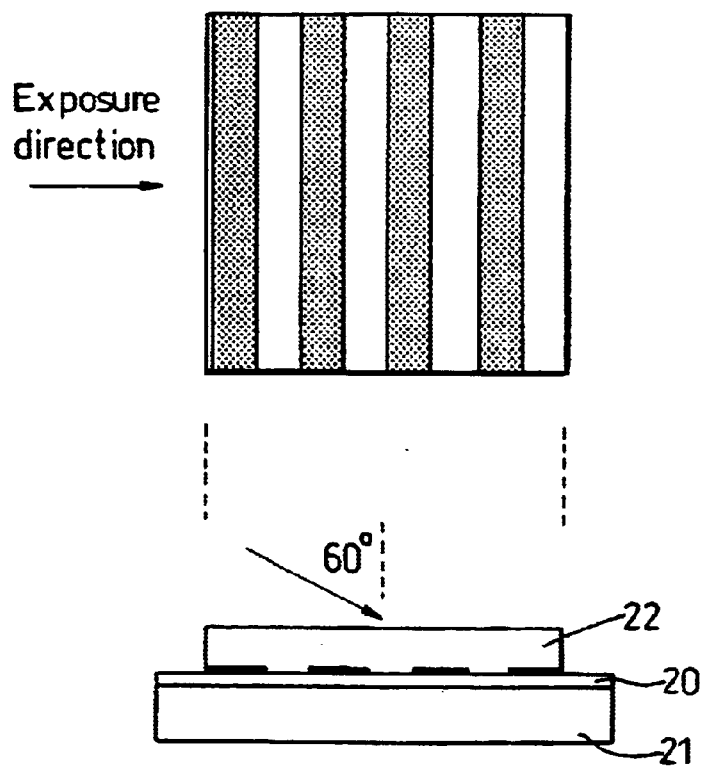
FIG. 3 shows the configuration for photolithographic exposure leading to the formation of an asymmetric monograting useful in twisted nematic devices.

The improvement in operation of a 90° twisted nematic cell with weak surface anchoring was first analysed theoretically. The static configuration of the cell was calculated by minimising the total free energy which is dictated by the Euler-Lagrange equation in the bulk and by equations (1) and (2) at the surfaces. The zenithal anchoring energy $W_\theta$ was then relaxed from its usual large value and the effect on the static configuration was calculated. FIG. 3 shows several curves calculated for different surface extrapolation lenghts, L where $L=k_{11}/W_\theta \cdot d$. The parameters common to all the curves are;

$k_{22}/k_{11}=0.6$; $k_{33}/k_{11}=1.5$; $\epsilon_{para}=14.0$; $\epsilon_{per}=4.0$; Cell twist= 90°; Surface pretilt=5°

Figure 11:
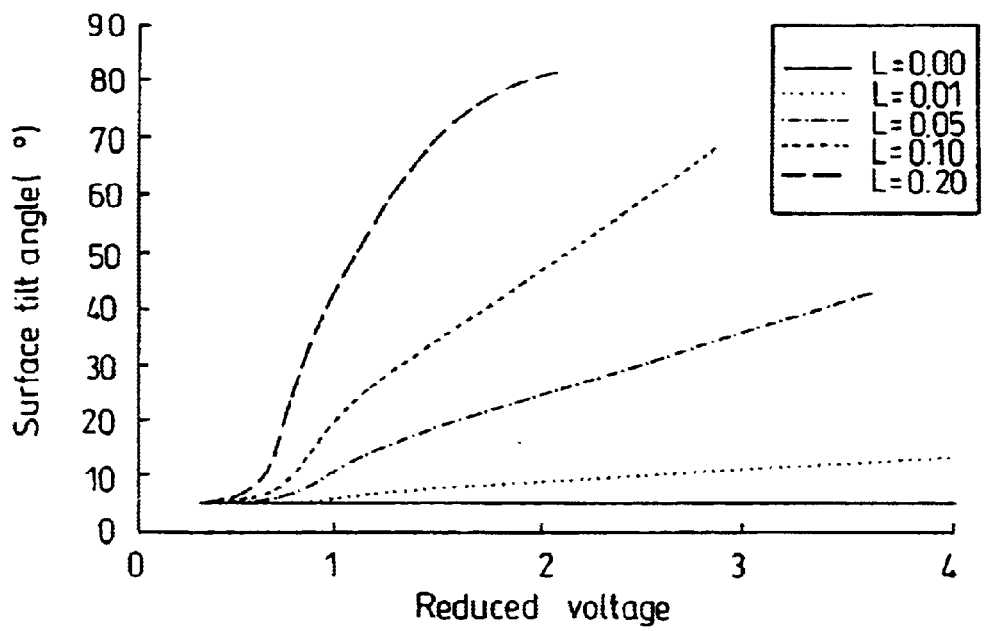
FIG. 11 shows the theoretical surface director tilt versus voltage for values of surface extrapolation lengths L.

The reduced voltage is defined as the voltage which has been normalised by the Frederiskz threshold voltage, (= $\sqrt{k_{11}/\epsilon_o \Delta \epsilon}$). FIG. 11 shows the surface tilt angle as a function of applied voltage. For infinite zenithal anchoring energy (L=0.0) the tilt remains fixed at the zero volt pretilt value. However for finite anchoring (L>0) all the curves show that the surface director is reoriented by the applied field and shows an increasing tilt angle with voltage. It is expected that this voltage induced tilt will lead to a better contrast ratio in a typical normally-white twisted nematic device.

Figure 12:
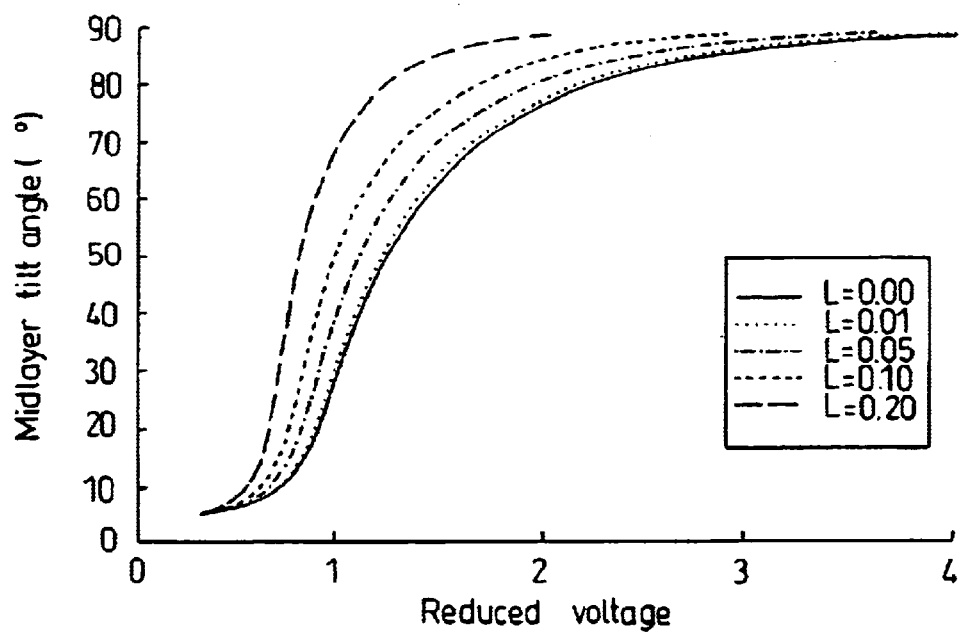
FIG. 12 shows the theoretical midlayer director tilt versus voltage for values of L.

FIG. 12 has been calculated with the same parameters as FIG. 11 but now shows the voltage dependent tilt in the middle of the nematic layer. This tilt angle is the dominant parameter in dictating the optical transmission of the twisted nematic device. Therefore, it is clear to see that a surface offering a finite L will lead to a lower voltage, steeper electrooptic response.

Therefore, the above modeling has shown that a surface treatment which lowers $W_\theta$ will lead to a twisted nematic device which has a lower voltage threshold, a steeper electrooptic response and a higher contrast at a given voltage.

EXAMPLE TN1

An example of a weak anchoring treatment applied to a twisted nematic is now given. The pretilted alignment surface used in this example was an asymmetric monograting as described in GB 9402492.4; GB-A-2,296,466; WO-95/22078.

The treatment consists of adding a small (1–10%) amount of a UV curing adhesive material to the nematic prior to cell filling. Examples of suitable materials include N65, N63, N60 or N123 (All manufactured by Norland Products Incorporated, North Brunswick, N.J., USA). In this particular example, one of these materials (N65) is used as an additive to the nematic E7 (Merck). This material contains a mixture of esters and acrylate monomers which polymerise under UV radiation.

Before using the N65 additive in a twisted nematic device a set of experiments were carried out in order to show the effect of the N65 treatment on the zenithal anchoring energy, $W_\theta$. This quantity can be calculated by measuring the saturation voltage, $V_s$. That is, the voltage at which the director tilt in the cell is perpendicular to the surface throughout the thickness of the cell. This can be measured in cells where the surfaces have no preferred alignment direction. In this case flat surfaces of hardbaked photoresist were used (Shipley 1805). This material was spin coated on ITO coated glass to form a 0.55 μm thick layer. Baking at 160° C. for 45 minutes ensured full insolubility in the liquid crystal. When filled with N65/E7 mixtures, these cells show a random Schlerien texture. The saturation voltage was measured by observing when the transmitted intensity of the Schlerien texture falls to zero when viewed between crossed polarisers. $W_{74}$ is then given by:

$$W_\theta \approx \frac{3.85\sqrt{\varepsilon_o \Delta \varepsilon k_{11}} \cdot V_s}{d} \quad (4)$$

where d is the liquid crystal thickness, $k_{11}$ is the liquid crystal splay elastic constant and $\Delta\varepsilon$ is the liquid crystal permittivity anisotropy.

Results are shown in table 1. The pure E7 cell failed to show a black state before cell breakdown and so only a lower limit on $W_\theta$ can be given. In the cases of the E7 containing N65, the curing was performed in a fused silica cell for 10 minutes prior to transferring the mixture to a separate measurement cell. The exposure was carried out using an unfiltered mercury lamp with an optical output of 2.0 mW/cm$^2$ at a raised temperature of 65° C.

TABLE 1

| Cell mixture | $W_\theta$(N m$^{-1}$) |
| --- | --- |
| Pure E7 | >5 × 10$^{-2}$ |
| 2% N65 in E7 | 6.3 × 10$^{-3}$ |

Surface zenithal anchoring energies modified by the presence of N65.

The above results clearly show that the N65 has reduced the value of $W_\theta$ in a cell with flat surfaces. The next step is to study the effect of this additive on the operation of a twisted nematic device.

Such a twisted nematic device may employ asymmetric monogratings to induce pretilted alignment and be fabricated in the following way as shown in FIG. 3: Shipley 1805 photoresist 20 was spin coated at 3000 rpm onto ITO coated glass 21 for 30 seconds. Net the photoresist layer 20 was baked at 90° C. for 30 minutes to remove the solvent. Exposure of the photoresist through a mask 22 was carried out using off axis hard contact photolithography. The mask 22 consisted of a chrome on glass pattern with a pitch of 1 μm (0.5 μm gaps and 0.5 μm chrome strips). The exposure time was set to 540 seconds with an incident power of 0.15 mW/cm$^2$ from a mercury lamp. Development was then carried out in Shipley MF319 for 10 s followed by a water rinse. Samples were finally baked at 160° C. for 45 minutes after first receiving a deep UV exposure to preharden the photoresist (3.36 J/cm$^2$ at 254 nm).

The above process resulted in a surface monograting with a 1 μm pitch and a 0.5 μm peak to trough groove depth. The profile is asymmetric (approximately sawtooth in form) which leads to a pretilted alignment if the nematic is under the influence of a bulk twist torque (see GB-A-2,296,466; WO-95/22078). These surfaces were constructed into cells in which the groove direction on one surface was orthogonal to the groove direction on the other. The cell gap was set to 2.05 μm which corresponds to the first Gooch and Tarry minimum when used with E7 (J. Phys. D. Appl. Phys. vol. 8, p. 1575 (1975) ). Filling was then carried out using E7 in the isotropic phase (65° C.) followed by slow cooling to room temperature.

Figure 4:
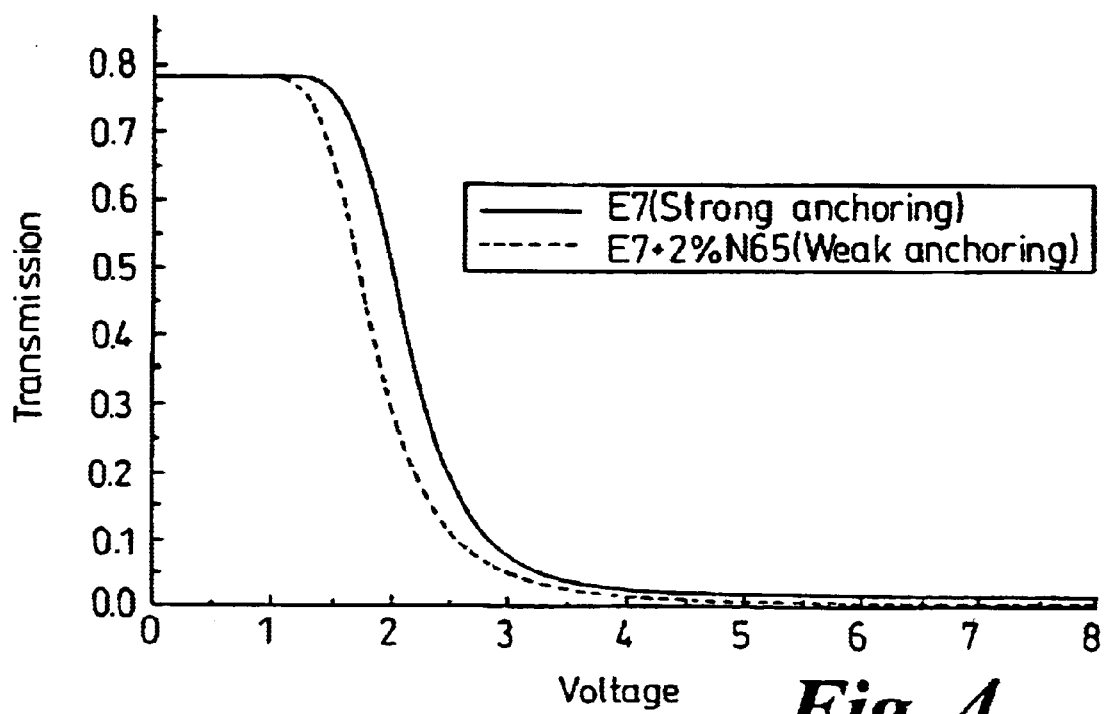
FIG. 4 shows the transmission versus voltage data for two twisted nematic cells, one of which (dotted line) has been treated with an additive (Norland 65) to give weak anchoring on asymmetric gratings.

The electrooptic response of cells containing different N65/E7 mixture was then recorded by placing the twisted nematic cell between crossed polarisers which were oriented parallel to the adjacent grating alignment directions. Transmission was measured using a photodiode with a photooptic response during the application of a 1 kHz sinusoidal drive waveform. FIG. 4 shows the transmission versus rms voltage for two cells one of which was treated to give weak anchoring. The weak anchoring treatment consisted of adding 2% N65 to E7 and curing for 10 minutes in a pre-cell before transferring the material to the test cell. The data clearly shows that the weak anchoring treatment has lowered the operating voltage. A transmission of 50% of the zero volt value is reached at a voltage of 1.83 V for the weak anchored surface and 2.13 V for the strong anchored surface. The power consumption of a display can be considered in the most simple case as the power required to charge and discharge a capacitor which is proportional to V$^2$. Therefore the weak anchored surface is expected to allow a power saving of roughly 35%.

Figure 5:
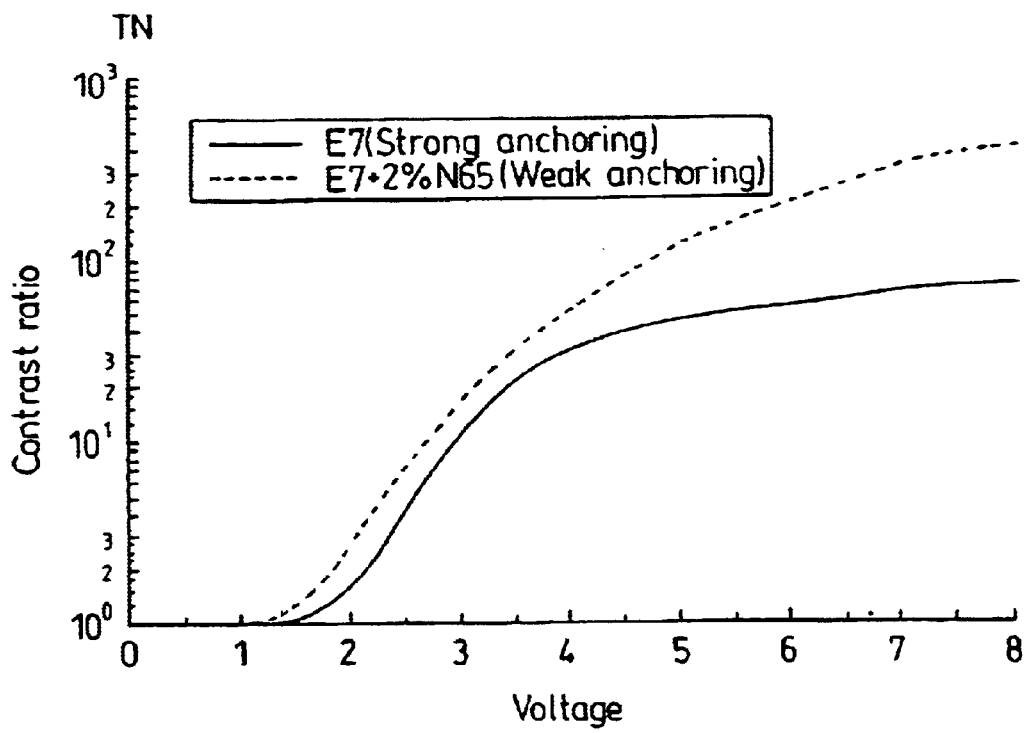
FIG. 5 shows the optical contrast ratio versus voltage data for two twisted cells, one of which (dotted line) has been treated with an additive to give weak anchoring.

The second improvement of the weak anchored cell is the improved optical contrast ratio as shown in FIG. 5. At 5 V the weak anchored cell has a contrast ratio of 126 while the strong anchored cell has a contrast ratio of 49. At 8 V the difference is even larger (410 and 74 respectively). Therefore, a particular application demands a certain contrast ratio then it can be reached at a much lower voltage with a weak anchored surface. The weak anchoring has also lead to a slight increase in the steepness of the electrooptic response. For the weak anchored surface $V_{90}$–$V_{50}$ is 0.454 V while for the strong surface this quantity is 0.510 V; $V_{90}$ and $V_{50}$ being the voltage at transmissions of 90% and 50% of the zero voltage transmission value respectively.

In summary, the above experimental results have shown qualitative agreement with the theoretical analysis by demonstrating that a surface which has been treated to give a lower $W_\theta$ can improve a twisted nematic device. The improvements include a lower voltage threshold, a steeper electro optic response, and a higher optical contrast.

EXAMPLE TN2

In this example MXM035 (Merck) was used as the weak anchoring treatment. The alignment surfaces were asymmetric monogratings as described in example TN1.

The MXM035 consists of two parts which were mixed in equal quantities. This mixture was then added to E7 nematic to give a 4% solution which was cured in a fused silica cell (as described in example TN1) before transferring to a test cell. A measurement of $W_\theta$ for the 4% solution revealed a value of 3.85×10$^{-4}$J/m$^2$. This is 16 times smaller than the value of measured for N65 (in example TN1). Therefore, the MXM 035 tent is expected to have a larger effect on the operating behaviour of a TN device.

Cells were constructed using asymmetric monogratings as alignment surfaces. The groove direction on one surface was orthogonal to that on the other to ensure a twisted configuration with a liquid crystal twist of roughly 90°. The cell gap was set to 2.05 μm (the first Gooch and Tarry minimum). FIG. 13 shows the transmission versus rms voltage for two cells, one of which was treated with 4% MXM035 to give weak anchoring. In this case the weak anchoring treatment has lead to a very large decrease in operating voltage. A transmission of 50% of the zero volt value is reached at a voltage of 0.8 V for the weak anchored surface compared to 1.93 V for the strong anchored surface. Hence the weak anchored TN is expected to use only 17% of the operating power of a conventional TN.

Weak anchoring treatments can also lead to improvements in performance when the call gap is larger. To demonstrate this, data was taken from two more TN cells which had been constructed with a cell gap of 4.6 μm which corresponds to the second Gooch and Tarry minimum for E7. One of these was filled with pure E7 while the other was filled with 4%

MXM035 in E7 which had been precured as described above. FIG. 14 shows the electrooptic response for these two cells. Once again the weak anchored cell shows a response at a much lower voltage. The 50% transmission occurs at 1.07 V for the weak anchored TN compared to 2.16 V for the conventional TN. The weak anchoring treatments are expected to change the dynamic response of the TN and so optical response times were measured for these cells for switching between 0 V and 4V as shown in table 2. It can be seen that the addition of MXM035 has lead to a decease in switch-on time ($\tau_{on}$) and an increase in switch-off time ($\tau_{off}$). This behaviour is consistent with weak surface anchoring.

TABLE 2

| Cell Mixture | $\tau_{on}$ (ms) | $\tau_{offee}$ (ms) |
| --- | --- | --- |
| E7 | 6.8 | 15.5 |
| E7 + 4% MXM035 | 2.5 | 24.0 |

0–4 V optical switching times for second minimum TN cells with strong or weak anchoring.

EXAMPLE TN3

Figure 10:
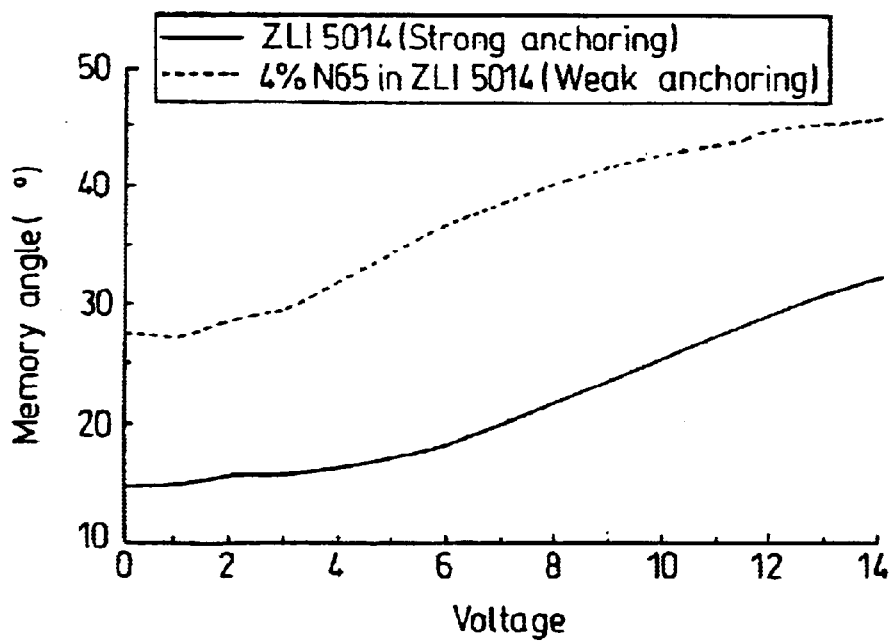
FIG. 10 shows variation in memory angle against applied voltage for two bistable ferroelectric liquid crystal devices, one with standard alignment, the other with a weak surface anchoring energy.

Weak anchoring treatments can also be used in conjunction with other surface alignments to improve TN performance. In this example the MXM035 treatment is used in conjunction with a rubbed polymer alignment. Rubbed alignment surfaces were prepared by spin coating a layer of probomide 32 (Ciba Geigy) onto ITO coated glass and baking the suites at 300° C. The surfaces were then rubbed in one direction by a nylon cloth attached to a rotating roller. Finally cells were constructed in which the rubbing direction on one surface was orthogonal to that on the other. The cell gap was set to 4.6 μm using monodispersed space beads in the edge seal. FIG. 10 shows a comparison of electrooptic responses recorded from two TN cells, one filed with E7 and the other filled with E7+4% MX035. Once again the addition of the weak anchoring treatment has lead to a reduction in operating voltage.

EXAMPLE TN4

One particular type of twisted nematic device is the VCT device, which switches from a substantially non-twisted state to a twisted state when a voltage is applied. In this example the operation of the VCT device is improved by the addition of a weak anchoring treatment. The surface alignment in this example was provided by asymmetric grating surfaces as described in example TN1.

The weak anchoring treatment was M035 mixed from 10% of part A and 90% of part B. 4% of this mixture was added to nematic MLC 6608 which has a negative dielectric anisotropy. The MXM035 was then cured by placing the MXM0351/MLC6608 mixture in a glass cell and exposing to UV radiation (10 minutes at 2.0 mW/cm² while at a temperature of 65° C.). After curing, the mixture was used to fill a VCT test cell.

Figure 6:
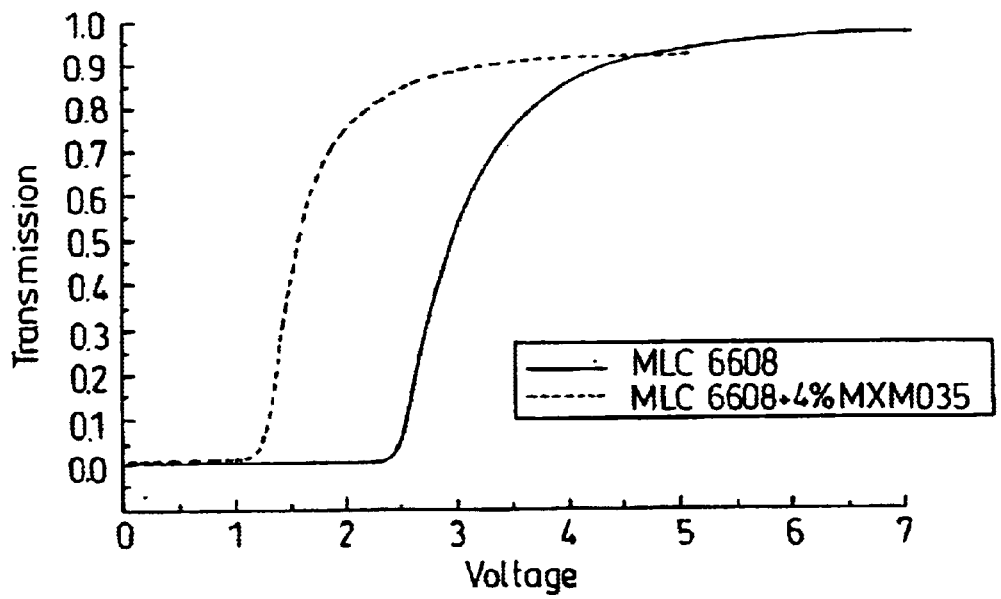
FIG. 6 shows transmission—voltage curves for two voltage controlled twist type cells, one with a standard alignment, the other with a weak anchoring energy treatment.

The VCT cells were constructed so that the grating grooves on one surface were orthogonal to those on the other. Prior to construction, the grating on one surface was treated with a chrome complex surfactant in order to induce a homeotropic boundary condition (molecules perpendicular to the wall surface). The grating on the other surface was left untreated in order to induce a planar boundary condition. The cell gap was set to 5.3 μm using spacer beads in the edge seal. FIG. 6 shows the electrooptic response of two VCT devices, one of which contains the weak anchoring treatment The VCT containing pure MLC6608 exhibits 50% transmission at a voltage of 2.91 V while the VCT containing 4% MXM035 in MLC 6608 exhibits 50% transmission at a voltage of 1.52 V. Therefore, the weak anchoring treatment has lead to a dramatic decrease in operating voltage.

The dynamic response times of the VCT were measured for these cells for switching between 0 V and 5V as shown in table 3. It can be seen that the addition of MM035 has lead to a decrease in switch-on time ($\tau_{on}$) and an increase in switch-off time ($\tau_{off}$).

TABLE 3

| Cell Mixture | $\tau_{on}$ (ms) | $\tau_{offee}$ (ms) |
| --- | --- | --- |
| MSc 6608 | 86 | 60 |
| MSC 6608 + 4% MXM035 | 60 | 112 |

0–5 V optical switching times for VCT cells with strong or weak anchoring.

The above examples show that the addition of oligomeric materials (Norland 65, MXM035) into cells with either grating surfaces or rubbed polymer surfaces will lead to a reduction in the operating voltage of a twisted nematic device.

Bistable Nematic Devices

These have substantially the same basic construction as shown in FIGS. 1 and 2, with certain differences. The input polariser is parallel to one alignment state for the case where the alignment states differ in azimuthal angle by 90°. The most significant practical difference is that at least one of the cell walks 3, 4 are treated with alignment gratings to provide a bistable alignment (rather than a monostable alignment as for the twisted nematic case), i.e., two stable alignment directions shown as R,R' 45° apart, but may be 90°. For example, the alignment may be provided by a bigrating with symmetric and asymmetric profiles to give both alignment and a required amount of pretilt. Techniques for producing bigratings to give bistable nematic devices are described in GB-A-2,286,467 (PCT-WO-95/22077) and WO97/14990, (PCT-96/02463, GB95 21106.6).

The second surface of the cell (if not provided with a bigrating) may be treated with either a planar or homeotropic monostable surface.

Conventional alignment techniques provide pretilt (zenithal) and alignment direction (azimuthal) with substantial anchoring energy. This means that switching of the device under the influence of electric fields results in movement of the liquid crystal molecules mostly in the centre of the layer, and zero movement at and adjacent the wall surface. Both pretilt and alignment direction are necessary for good device performance. What is wanted is pretilt values and alignment together with reduced anchoring energy so that molecules at or adjacent the cell walls can move under the application of normal voltage levels.

The Embodiments of the present invention provide such a wanted pretilt and alignment together with lowered surface anchoring energy. The invention does this, in one embodiment, by inclusion of oligomer units in the liquid crystal layer 2 and which preferentially migrate to the cell wall surfaces.

Bistable nematic switching relies on surface director reorientation and in order to achieve low voltage switching both the zenithal and azimuthal anchoring energies must be reduced.

Furthermore any additional inelastic memory azimuthal anchoring (P. Vetter et al, Euro Display 1993, SID, p.9) due to microscopic absorption of the first nematic layer into the surface must be removed. This anchoring memory may have the effect of pinning molecules in a given position (e.g. between the two switched states) to which they may return after removal of a voltage. Ideally, this memory should be completely removed so that the molecules remain in their switched positions after removal of voltages. In practice, reduction, rather than complete removal can be satisfactory.

Three examples of the weak anchoring treatment applied to a bistable surface are now given:

EXAMPLE BN1

The treatment consists of adding a small (1–10%) amount of a UV curing adhesive material to the nematic prior to cell filling. Examples of suitable materials include N65, N63, N60 or N123 (All manufactured by Norland Products Incorporated, North Brunswick, N.J., USA). In this particular example, one of these materials (N65) is used.

In the first experiment, this material was added to nematic E7 in concentrations of 1% 2%, 4% and 6%. The mixture was then used to fill cells whose inside walls were coated with flat polymer layers, without any alignment direction. The purpose of this experiment was to confirm a weakening of the surface anchoring with the addition of N65. Surfaces were prepared using a layer of photoresist (Shipley 1805) which was hardbaked to 160° C. to ensure insolubility in the liquid crystal.

Cells were made using these surface with a gap of 10 $\mu$m. Each was filled with a different concentration of N65 including a control sample of pure E7. Filling was carried out in the isotropic phase (65° C.) followed by slow cooling to room temperature, and without exposure to UV light. All cells showed a random planar alignment of the nematic which is also called a Schlerien texture. In the case of the pure E7, 1% N65 and 2% N65, the texture could not be moved by applying finger Pressure to the cell walls whereas for the 4% and 6% mixtures, the texture was highly mobile and domain walls could be easily moved by applying small amounts of pressure. Once the domain walls had been moved they did not return to their original position but instead remained in the now position for longer than several days. Therefore, 4% and 6% mixtures lead to a loss of memory anchoring.

A second similar experiment was carried out in which the cells were exposed to UV radiation after filling but before cooling to room temperature. In this case, the 4%, 6% and also the 2% mixtures showed room temperature domain wall mobility. The improvement in the 2% mixture can be explained as follows. The N65 material contains both esters and acrylate monomers which polymerise under UV radiation to form oligomer units which then join together to form larger polymer chains. If the 2% solution is cured for a short time then the reaction can be terminated when only oligomer units have been formed. The oligomers do not phase separate from the liquid crystal but they so migrate preferentially to the surface in order to minimise the surface free energy. This has the effect of diluting the amount of liquid crystal at the surface which leads to an effective reduction in the order parameter, S which is defined by (P. G. deGennes, The Physics of Liquid Crystals, Clarandon Press, Oxford 1974):

$$S = \frac{1}{2}((3\cos^2\theta - 1)) \quad (3)$$

The reduction in nematic order due to a oligomer concentration has the twofold effect of screening the liquid crystal from the surface which removes the memory anchoring as well as reducing the elastic anchoring energy, $W_\theta$. The uncured material also has this effect but must be added in a greater concentration (>4%) as the acrylate monomer does not preferentially migrate towards the surface.

The cured material containing 2% N65 was then removed from the cell in which it was cured and used to fill another cell. This second cell also showed a highly mobile Schlerien texture demonstrating that the weak anchoring effect is due to the additive in the bulk as opposed to any surface layer formed during curing.

The next set of experiments were designed to show the effect of the N65 treatment on the zenithal anchoring energy, $W_\theta$. This quantity can be calculated by measuring the saturation voltage, $V_s$ as described in example TN1.

Results are shown in Table 4. The pure E7 cell failed to show a black state before cell breakdown and so only a lower limit on $W_\theta$ can be given. In the cases of the E7 containing N65, the curing was performed in a fused silica cell prior to transferring the mixture to a separate measurement cell. The exposure was carried out using an unfiltered mercury lamp with an optical output of 2.0 mW/cm$^2$.

TABLE 4

| Cell mixture | Cure time (m) | $W_\theta$(N m$^{-1}$) |
| --- | --- | --- |
| Pure E7 | — | >5 × 10$^{-2}$ |
| 2% N65 in E7 | 5 | 5.4 × 10$^{-3}$ |
| 2% N65 in E7 | 10 | 6.3 × 10$^{-3}$ |
| 2% N65 in E7 | 30 | 7.7 × 10$^{-3}$ |
| 2% N65 in E7 + pure E7 (1:1) | 10 | 8.0 × 10$^{-3}$ |

Surface zenithal anchoring energies modified by the presence of N65.

Greater cure times are found to lead to stronger anchoring which is consistent with the formation of longer polymer chains which tend to phase separate form the nematic rather than lower its surface order parameter. One set of data shows that the anchoring energy can also be adjusted by diluting the N65/E7 mixture in pure E7. In all cases the percentage of N65 during the cure process was kept to 2% to ensure consistent reaction kinetics.

The above results confirm that the N65 treatment leads to a loss of in-plane memory anchoring as well as lowering (by about an order of magnitude) the zenithal anchoring energy. The next stage is to test the effect of the treatment on the switching of a bistable nematic device.

Figure 7:
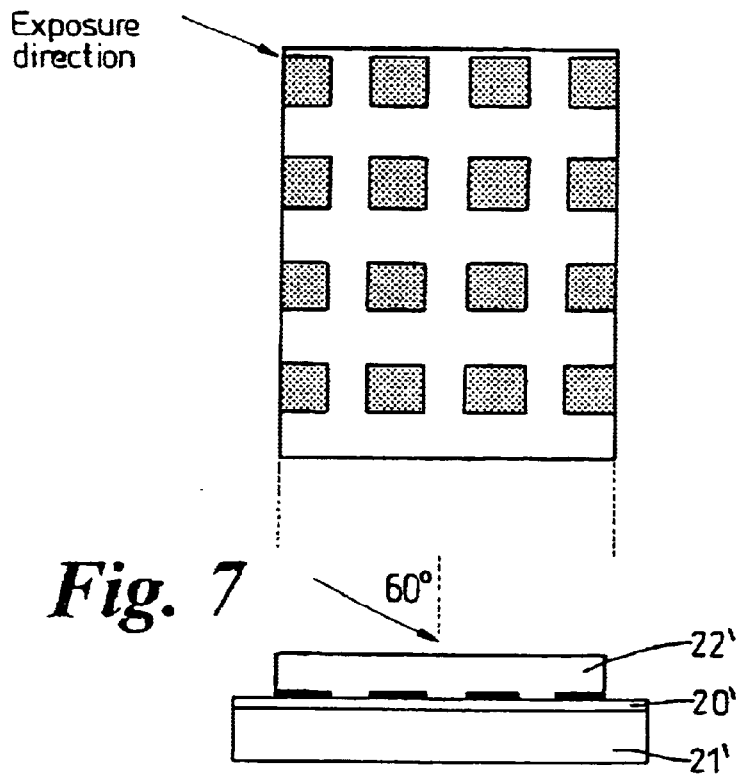
FIG. 7 shows the configuration for photolithographic exposure leading to the formation of a bigrating with orthogonal grating modulations.

One example of a surface which can offer bistable nematic alignment is a surface bigrating (as described in GB2286467-A) prepared in a manner similar to that shown in FIG. 7. In this case samples were made by spin coating 1805 photoresist 20 onto ITO coated glass 21 at a spin speed of 3000 rpm to give a coating thickness of 0.55 $\mu$m. The samples were then softbaked at 90° C. for 30 minutes. The bigrating was exposed through a mask 22 using hard contact photolithography (i.e. normal to the mask 22 surface, not at 60° as in FIG. 7) with a typical exposure time of 250 s (at 0.3 mW/cm$^2$). The mask 22 contained a bigrating pattern of 0.9 $\mu$m chrome squares separated by 0.5 $\mu$m gaps in each direction giving a pitch of 1.4×4 $\mu$m. Development was then carried out in Shipley MF319 for 10 sec followed by a water rinse. Samples were finally baked at 160° C. for 45 minutes after first removing a deep UV exposure to preharden the photoresist (3.36 J/cm² at 254 nm). This process created a bigrating with two identical modulations each of which had a symmetric profile. The alignment of a nematic on this is therefore expected to consist of two non tilted alignment states (alignment, but no surface tilt) separated by an azimuthal angle of 90°. Such an alignment is not normally of use in display devices, but was prepared for test and comparison purposes.

Cells having a cell gap of 0.95 µm were then made with these (zero pretilt) bigratings on both inner surfaces arranged so that the groove directions on one surface coincided with the groove directions on the other. These were filled with E7 nematic containing various concentrations of N65 in its isotropic phase. On cooling to room temperature all cells showed two alignment directions as expected. As the states have no surface pretilt, and hence no splay, there is no method (like the flexoelectric coupling in splayed configurations) by which only one state can be selected using applied electrical pulses. However random switching between the states can occur which was seen by pulse-induced domain wall movement.

Figure 8:
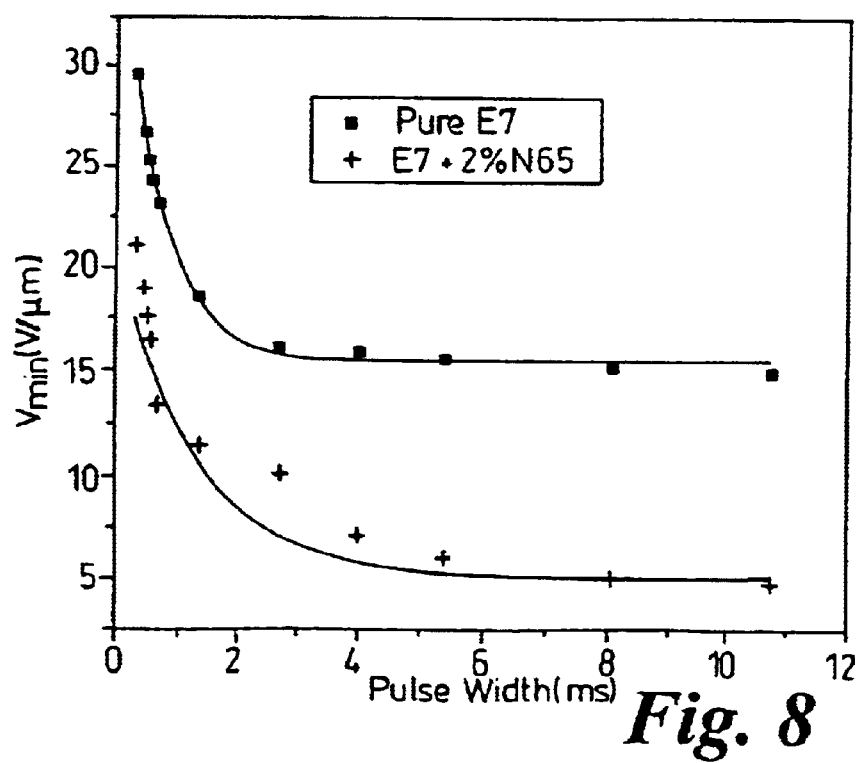
FIG. 8 shows switching characteristics for two bistable cells, one with standard alignment, the other with a weak surface anchoring energy.

Rectangular monopolar pulses of various pulse lengths were applied to each cell. Each pulse alternated in sign from the previous pulse to maintain a dc balance. Pulses were separated by a time interval 100 times the pulse length. For each pulse length a voltage existed above which domain wall movement occurred. FIG. 8 shows this threshold voltage versus time for two cell; one a cell filled with pure E7, and the other a cell filled with a 2% precured mixture of N65 in E7. The N65 has clearly lowered the voltage threshold to a value of only 5.0 V/µm for a 10.8 ms pulse. In contrast, the pure E7 cell shows a much higher voltage switching (15.0 V/µm) and in fact suffered dielectric breakdown for low pulse lengths.

The above results show that the N65 treatment lads to a low voltage bistable switching which is consistent with a low zenithal anchoring energy combined with no in-plane memory anchoring other an the elastic $W_\phi$ imposed by the bigrating.

In order to obtain fully selective bistable switching one state has to be favoured by the applied pulse. This can be achieved using dc coupling to a flexoelectric polarisation if the two bistable states have the appropriate pretilts. In WO 9210054, pretilt can be obtained by using obliquely evaporated SiO.

A more controllable method, described in GB2286467-A achieves pretilt by using a bigrating in which both modulations have asymmetric profiles. This method allows a pretilt of typically 17° for one of the bistable states while maintaining a pretilt of 0° for the other state. These surfaces were tested in conjunction with the N65 treatment using the following fabrication process as illustrated in FIG. 7.

A thin layer 20' of 1805 photoresist was spun onto ITO coated glass 21' as described above. After softbaking, the layer 20' was exposed through the 1.4×14 µm pitch mask 22' using an off axis diagonal exposure geometry as shown in FIG. 7; i.e., exposure at about 60° to the surface normal and about 45° to the mask array of square pixels. The exposure time was set to 540 seconds (at 0.15 mW/cm²). After development and processing, the bigrating was constructed opposite a flat photoresist surface (i.e., no grating and hence zero pretilt) using 10 µm cell spacers to allow measurement of the surface pretilt at the bigrating surface.

Table 5 shows the pretilt of the tilted state measured by the crystal rotation method (T. J. Scheffer and J. Nebring, J. Appl. Phys., vol.48, no. 5, p. 1783 (1977)) for cells filled with various mixtures. In all cases the non-tilted state had a pretilt of less than 0.1%.

TABLE 5

| Mixture used to fill cell | Pretilt (°) |
|---|---|
| Pure E7 | 17.5 |
| 2% N65 in E7 + pure E7 (1:1) | 17.1 |
| 2% N65 in E7 + pure E7 (2:1) | 15.4 |
| 2% N65 in E7 | 2.2 |

Surface pretilt modified by the presence of N65.

The pure E7 gave a high pretilt as expected but the addition of 2% N65 (precured) lead to a catastrophic loss of pretilt which means that this treatment is not suitable for a flexoelectric coupled device where a significant pretilt is required in order to achieve dc sensitivity. However further diluting of the 2% mixture via addition of pure E7 allows the pretilt to be at a value close to the pure E7 cell.

Comparison of data in table 4 and table 5 shows that it is possible to obtain a mix regime which provides weak zenithal anchoring while maintaining surface pretilt. The loss of pretilt for 2% N65 in E7 can be understood by the further weakening of $W_\theta$ which allows the nematic to adopt a non tangential orientation with the local surface. This destabilises the high pretilt state with respect to the low pretilt state. Such states are described in GB9502635.7, "liquid crystal device alignment", G. P. Bryan-Brown, C. V. Brown and D. G. McDonnell.

The above results have shown one example of how an oligomeric additive (N65) can be mixed with a typical nematic (e.g BE7) to improve the voltage response of a bistable nematic device without compromising other surface parameters such as pretilt.

EXAMPLE BN2

Another example of a weak anchoring treatment was synthesised using block polymerisation of a thiol and a vinyl ether to form the structure A shown below, the subscript n is number of repeats in a chain.

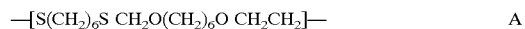

—[S(CH₂)₆S CH₂O(CH₂)₆O CH₂CH₂]—    A

As in example BN1, the precursor materials were added to E7 and then cured in a fused silica pre-cell. The cured mixture was then transferred to a second cell whose inner surfaces were coated with hardbaked photoresist. Filling was carried out at 65° C. followed by slow cooling to room temperature. One particular cell was filled with a mixture which had been cured from a 5% solution of the precursor materials in E7. This cell showed a schlerien texture with highly mobile domain walls confirming that all in-plane memory anchoring had been lost.

A measurement of the saturation voltage revealed that the zenithal anchoring energy had been lowered to a value of $1.2 \times 10^{-3}$ N m⁻¹. This is even lower than the values shown in table 4 which indicates that the oligomer units formed in this case are more effective at lowering the surface order parameter of the nematic phase. Once again dilution of the 5% solution into pure E7 revealed a regime on grating surfaces in which weak zenithal anchoring was combined with high (>15°) pretilt.

Therefore, the structure A is another successful example of an oligomer which can be added to a nematic (e.g. E7) to improve the voltage response of a bistable nematic device without compromising other surface parameters such as pretilt.

EXAMPLE BN3

The following structures B is a list of example monomers which can also be used to created weak anchoring treatments.

| | | |
|---|---|---|
| $CH_2=CH\ O(CH_2)_6O\ CH=CH_2$ | HDVE (Hexane -1,6-diol di (vinyl ether) | ...B |
| $CH_2=CHOC_4H_9$ | BVE (Butyl vinyl ether) | ...B |
| $HSCH_2CO_2(CH_2)_2OCOCH\ S_2H$ | EGTG (Ethylene glycol bis (thioglycollate)) | ...B |
| $HS(CH_2)_9SH$ | NDT (Nonane-1,9-dithiol) | ...B |

In previous examples low voltage bistable nematic switching has been shown to occur when $W_q$ is lowered. Therefore, the materials in B have been investigated to determine their effect on $W_\theta$.

Mixtures of these materials were cured before adding to the liquid crystal and the final mixture was tested in cells containing flat hardbaked photoresist on the inner surfaces as described in example BN1. Values of $W_\theta$ were then obtained using the method described in example BN1.

Of the materials listed, EGTG and NDT are monomers with thiol terminations while HDVE and BVE are difunctional and monofunctional '-ene' materials, respectively.

The first set of mixtures studied are shown in table 6. In each case a percentage of monofunctional BVE has been added to the bifunctional HDVE in order to induce chain termination and so form oligomers with smaller molecular weights. In each case the quoted percentage is the molar quantity of BVE with respect to HDVE. Furthermore, the quantity of NDT in each mixture was varied to maintain an equal number of thiol groups and ene groups. To each mixture was added 1% of Igracure 651 (Merck) which acts as a photoinitiator. For each material, curing was carried out under a mercury lamp (2.0 mW/cm$^2$) for 10 minutes. E7 (Merck) was used as the liquid crystal to which was added 2% of each material (by weight). The results in table 6 show that the resulting zenithal anchoring energy ($W_\theta$) lies in the range 3.6–8.8×10$^{-3}$ J m$^{-2}$. Therefore, all the mixtures can be considered to be successful in reducing the anchoring from the value found for pure E7 (>5×10$^{-2}$ J m$^2$). Furthermore addition of more BVE and hence shorter oligomer chains is found to lead to weaker anchoring.

TABLE 6

| Material | $W_\theta \times 10^{-3}$ J m$^{-2}$ |
|---|---|
| NDT/HDVE/2% BVE | 8.8 |
| NDT/HDVE/5% BVE | 5.9 |
| NDT/HDVE/20% BVE | 3.6 |

Measurement of zenithal anchoring for thiol/diene systems with chain termination.

The correlation of anchoring and molecular length for a given material type was further tested using a set of mixtures containing EGTG, HDVE and BVE. In this case GPC analysis was carried out in order to measure the molecular weights of each material as shown in table 7; Mn is number average of each chain, Mw is average weight per chain, and $W_\theta$ is zenithal anchoring energy. The smallest portion of BVE (2%) is indeed found to lead to the longest molecular weights and vice versa. 1% of each of these materials was added to E7 and $W_\theta$ was measured. The correlation of $W_\theta$ with molecular weight is fairly good considering the errors in the $W_\theta$ measurement.

TABLE 7

| Material | Mn | Mw | $W_\theta \times 10^{-3}$ J m$^{-2}$ |
|---|---|---|---|
| EGTG/HDVE/2% BE | 12640 | 27330 | 10.9 |
| EGTG/HDVE/5% BE | 6970 | 17140 | 5.3 |
| EGTG/HDVE/10% BE | 5000 | 11550 | 6.6 |
| EGTG/HDVE/20% BE | 2900 | 6200 | 4.4 |

Measurement of zenithal anchoring for thiol/diene systems with chain termination.

To summarise, in this example, two sets of materials have been studied and both have been found to lead to a reduction in $W_\theta$. Furthermore, samples of these materials have also been found to reduce the switching voltages in bistable nematic devices.

Smectic Devices

The display cell 101 shown in FIGS. 16, 17 comprises two glass walls 102, 103 spaced about 1–6 μm apart by a spacer ring 104 and/or distributed spacers.

Electrode structures 105, 106 of transparent tin oxide are formed on the inner face of both walls. These electrodes are shown as row and column forming an X, Y matrix but may be of other forms. For example, radial and curved shape for a polar coordinate display, or of segments form for a digital seven bar display, or plain sheet electrodes to form an optical shutter.

A layer 107 of smectic liquid crystal material is contained between the walls 102, 103 and space ring 104.

Polarisers 108, 109 are arranged in front of and behind the cell 101. Row 110 and column 111 drivers apply voltage signals to the cell. Two sets of waveforms are generated for supplying the row and column drivers 110, 111. A strobe waveform generator 112 supplies row waveforms, and a data waveforn generator 113 supplies ON and OFF waveforms to the column drivers 111. Overall control of timing and display format is controlled by a control logic unit 114.

Prior to assembly, the walls 102, 103 are surface treated by spinning on a thin layer of polymeric material such as polyimide or polyamide, drying and where appropriate curing; then buffing with a soft cloth (e.g., rayon) in a single direction $R_1$, $R_2$. This known treatment provides a surface alignment for liquid crystal molecules. In the nematic and cholesteric phases and in the absence of an applied electric field the molecules at the surface walls 102, 103 align themselves along the rubbing direction $R_1$, $R_2$ and at a pretilt angle ξ of about e.g., 2° to 10° to the surface.

The surface alignment treatment is arranged to provide the required value of pretilt ξ. For example, material polyimide (e.g., Polyimide 32) when rubbed gives a typical pretilt of about 2°; the actual value depends upon liquid crystal material and the processing. Alternatively, as described in GB-A-2,286; GB-A-2,286,467; GB-A-2,286,894; GB-A-2,2986.893, the cell walls may have formed thereon grating structures which provide a range of pretilt angles and alignment directions. The gratings may be symmetric and/or asymmetric in profile, and shaped to give any desired value of pretilt ξ, and azimuthal and zenithal anchoring energies β, α respectively.

The device may operate in a transmissive or reflective mode. In the former, light passing through the device e.g., from a tungsten bulb 115 is selectively transmitted or blocked to form the desired display. In the reflective mode, a mirror 116 is placed behind the second polariser 109 to reflect ambient light back through the cell 101 and two polarisers. By making the mirror 116 partly reflecting, the device may be operated both in a transmissive and reflective mode.

Pleochroic dyes may be added to the material 107. In this case only one polariser is needed and the layer thickness may typically be 4–10 μm.

Figure 9:
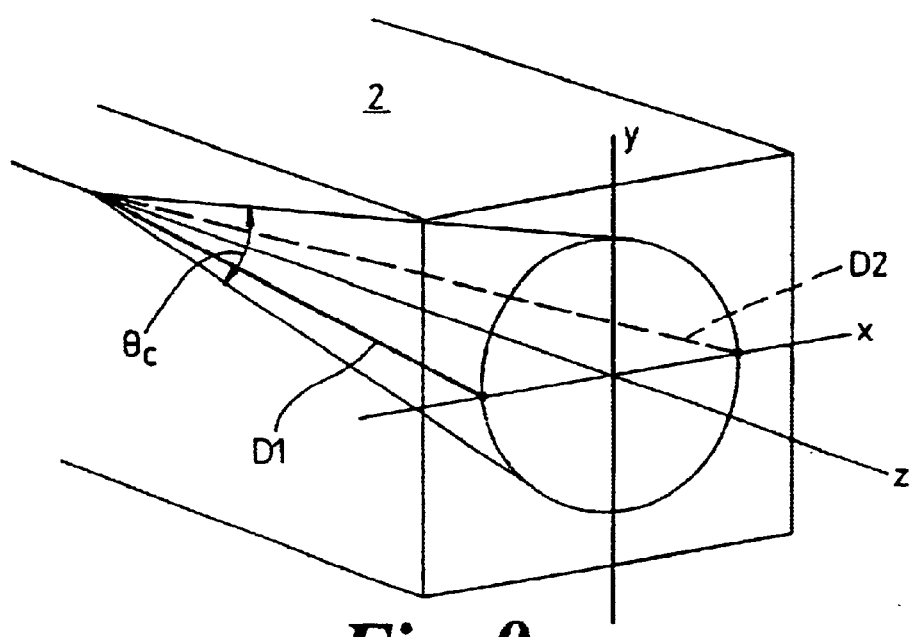
FIG. 9 shows diagrammatically a smectic liquid crystal molecule, and how it moves within a layer when switched to its bistable states in a ferroelectric liquid crystal cell.

If the smectic material 107 is a chiral smectic e.g., smectic C ($S_c^*$) then a bistable device can be made. Such a device is the surface stabilised ferroelectric device (SSFLC) supporting two bistable states which are optically distinct. In a chiral smectic material, molecules tend to lie and move along the surface of an (imaginary) cone as shown in FIG. 9. When the surface alignment directions R1, R2 are parallel the (z) axis of these cones are parallel to these alignment directions and the molecules lie on either side of the axis on the cone surface.

In one switched state, D1, the molecules lie on one side of the cone, and in the second bistable state, D2, lie on the other side of the cone. The switching is achieved by application of a voltage pulse of appropriate sign and length applied through the electrodes 106, 107 coupling with a spontaneous polarisation coefficient Ps of the material. The cone angle, $\theta_c$, is a function of material parameters. In devices, the molecules in their two switched positions D1, D2, do not lie on the extremities of the cone but some small distance away. This means that the angle between the bistable positions is somewhat less than the cone angle, and can be increased a bit by application of an ac voltage signal to the material. This is known as ac stabilisation mentioned above. Ideally, the angle between the switched states is 45° because this would allow maximum contrast for the cell when arranged between crossed polarisers 108, 109 with the axis of one polariser along one of the switched directions. This gives a dark state in one switched position and a light state in the other switched position.

The angular distance between the two states is defined as the memory angle, $\theta_m$ (see N. Itoh et al, Jpn. J. Appl. Phys., 31, L1089 (1992)). The optimum memory angle for maximum brightness in the light state is therefore 45°. However, most materials possess a memory angle which is much less than 45° and so suffer from loss in brightness.

A weak anchoring treatment can be added to a ferroelectric to increase the memory angle and so improve the display brightness. This treatment also allows small amounts of translational movement of microlayers formed during cooling from isotropic phases to smectic phases leading to improved alignment.

Example of Cell Preparation

Alignment surfaces were prepared by spin coating a layer of probomide 32 (Ciba Geigy) onto ITO coated glass and baking the substrates at 300° C. The surfaces were then rubbed in one direction R by a nylon cloth attached to a rotating roller. Finally cells were constructed in which the rubbing direction $R_1$ on one surface was parallel to that $R_2$ on the other. The cell gap (d) was set to 1.1 μm using monodispersed spacer beads in the edge seal. Each cell was then filled with ZLI 5014 (Merck) ferroelectric liquid crystal doped with small percentages of N65. Before filling the N65 was cured in a separate cell.

FIG. 10 shows the memory angle measured from two cells containing either pure ZLI 5014, or 4% N65 in ZLI 5014 as a function of applied voltage (50 kHz AC). The results clearly show that the weak anchoring treatment has lead to a significant increase in memory angle at all voltages. Therefore, the treatment has improved this ferroelectric device by increasing the ON state transmission between crossed polarisers. For example, at 5 V, the memory angle has increased from 17.1° to 34.4° which would lead to a device which is 3.7 times brighter.

Bistable ferro electric devices switch upon receipt of a unidirectional pulse of appropriate direction, amplitude, and length. Strobe pulses are applied sequentially down the rows, whilst one of two different data pulses are applied to each column. Examples of addressing are described in U.S. Pat. No. 5,497,173, GB2,232,802; U.S. Ser. No. 07/977,442, GB-2,262,831.

Several other smectic devices may be made with alignment surfaces of the present invention. For examples: electro-clinic smectic devices; mono stable ferro electric devices U.S. Pat. Nos. 5,061,047, 4,969,719, 4,997,264, colour change smectic projection cells U.S. Pat. No. 5,189, 534, GB2,236,403. The alignment may produce a chevron type C1 or C2 type of smectic micro layer arrangement; or a tilted bookshelf arrangement where rubbing directions on opposite walls are in the same direction, or real bookshelf alignment.

Reducing anchoring energy allows small amounts of translational movement to occur in micro layers formed during cooling from isotropic phases to smectic phases.

Reduction of anchoring energy can be applied to various smectic devices as follows:

(i) Bookshelf and Quasi-book-shelf with low surface viscosity and no surface memory effects.

Most materials used in FLC devices exhibit layer shrinkage on cooling through the SmC* phase due to the increase of the angle between the molecules and layer normal on cooling. The tendency for the pinning of the smectic layers at the surfaces then leads to the formation of a chevron structure.

If the pinning energy is sufficiently high to prevent any translational slippage of the layers (i.e., the energy cost associated with layer slippage is much greater than energies associated with the chevron interface, elastic distortion of the director in the triangular director profile, and the orientational surface energy associated with the director being unable to lie in the preferred alignment direction) the layer shrinking requires that the layers tilt with respect to the surface normal.

If both surfaces have similarly high layer slipping terms then the layers must tilt into a chevron structure which is necessarily symmetric about the central plane of the cell. For typical materials, this degree of layer shrinkage is such that the layer tilt angle δ is a constant fraction of the smectic cone angle θ usually about δ/θ=0.85. This causes a reduction in the angle between the two bistable states and hence optical contrast in the cell. A higher memory angle may be achieved by lowering δ in what is often termed quasi bookshelf geometry. If the layer pinning term is made sufficiently weak (for example a relatively high concentration of the surfactant is used) a bookshelf geometry is obtained i.e., δ=0. If the azimuthal angle β is also made sufficiently low then a uniform director profile is possible in which the two bistable states are at the optimum angle of ±θ to the rubbing direction. The resulting high contrast and brightness of the display is also combined with the other advantages of reduced/no surface memory effects (which would be a problem in other bookshelf devices) and faster response (due to the decoupling of the surface director from the solid surface the surface viscosity becomes equivalent to that of the bulk).

(ii) Chevron with improved memory angle.

This device uses the slippery surfactant at sufficient concentration to lower layer tilt angle in chevron geometry, thereby leading to a higher memory angle and improved brightness for multiplexed devices. However, it may be possible to lower the orientational surface energies without a strong effect on the translation energy (i.e., layer pinning). Thus, the chevron structure would remain to a large extent (i.e., δ remains unchanged) but the orientation of the director at the surface would be higher. For no applied AC field the surface twist of the director would approach that of the chevron interface. The optical uniformity of this state (and hence contrast) would be improved. Moreover, the lowered surface energy would increase the angle of the director at the surface with an applied AC field, and thus the brightness of an AC stabilised display will also be enhanced.

(iii) Improving isotropic to smectic transition.

Surfactant allows layers to slip easily over the surface to form an energy state (i.e., uniform layers) dictated by orientational properties of the surface alone (i.e., no translational restrictions). Particularly useful also in AFLC where N* (cholesteric) phase is usually not apparent, but also in other devices (e.g., FLC) where stringent material requirements prevent the use of an N(*) phase.

(iv) Improved stability to mechanical, triennial or electrical damage of smectic devices.

Disruption of a well aligned smectic sample though mechanical, electrical or thermal shock leads to pinning of the layers at the surface which is difficult to remove, even though the disrupted state is not the lowest energy state. If the pinning is removed then the system may relax back to this minimum energy state before the disruption.

(v) Improved high tilt chevron device.

High surface pre-tilts are used to ensure that the surface orientation of a FLC device in the chevron geometry approaches the cone angle and hence the memory angle is improved (this is used by CANON and is in Jones, Towler Hughes review). In the unwound N* phase the director has a large degree of splay and bend distortion. On cooling into the smectic A phase this bend cannot be supported, due to the presence of the layers and the distortion is pushed to the surfaces where the director is forced to lie away from the desired pretilt. This may lead to variations in the alignment and hence defects in the SmC* phase (until switched this geometry often forms a "sandy texture" on first cooling). Moreover, there may be a plastic change of the pre-tilt caused by the zenithal surface memory effect. This means that when cooled into the SmC* phase the effective pretilt is lowered and the resulting memory angle is reduced somewhat.

With the slippery surfactant, the surface memory is reduced and the pre-tilt remains unchanged Note, this is an example where the slippery surface technique is used in the nematic phase, but results in improved performance of a smectic device.

(vi) Improved Electroclinic and antiferroelectric (AFLC) devices

In both of these devices, director twist is induced by the DC electric field there is a tendency for the smectic layers to shrink. If pinned at the surface the applied field tends to induce layer tilt, (although in contradiction to the requirement that E ∥ Pi) which reduces optical appearance through defects, and may also reduce viewing angle since the director may tilt out of the cell plane. With the slippery surfactant, both the director and the layers can move easily across the surface, without surface memory or viscosity effects.

(viii) Improved N-SmC device.

Advantages ranging from: reduced tendency to form chevron type structure; reduced surface memory; faster surface switching.

(viii) Reduced tendency form T state formation in FLC

Due to reduced polar surface interaction. This ensures the good optical and electro-optical properties of any of the above devices (in particular the chevron and bookshelf devices).

(ix) Improved alignment of smectic devices.

Treatment prevents defects (for example, pitch lines in overlying N* phase, or C1 state/zig-zags in SmC*) from becoming pinned at surface irregularities.

The monomer materials used in embodiments of the invention may include the following, which are given only by way of example:

| | |
|---|---|
| methyl acrylate | propane-1,3-diol diacrylate |
| ethyl acrylate | butane-1,4-diol diacrylate |
| propyl acrylate | pentane-1,5-diol diacrylate |
| butyl acrylate | hexane-1,6-diol diacrylate |
| pentyl acrylate | heptane-1,7-diol diacrylate |
| 2-methylbutyl acrylate | octane-1,8-diol diacrylate |
| hexyl acrylate | nonane-1,9-diol diacrylate |
| heptyl acrylate | decane-1,10-diol diaclylate |
| octyl acrylate | glycerol triacrylate |
| nonyl acrylate | trimethylolpropane triacrylate |
| decyl acrylate | pentaerythritol triacrylate |
| ethyl hexyl acrylate | pentaerythritol tetraacrylate |
| methyl methacrylate | di-pentaerythritol hexaacrylate |
| ethyl methacrylate | ethylene glycol dimethacrylate |
| propyl methacrylate | 1,2-propylene glycol dimethacrylate |
| butyl methacrylate | propane-1,3-diol dimethacrylate |
| pentyl methacrylate | butane-1,4-diol dimethacrylate |
| 2-methylbutyl methacrylate | pentane-1,5-diol dimethacrylate |
| hexyl methacrylate | hexane-1,6-diol dimethacrylate |
| heptyl methacrylate | heptane-1,7-diol dimethacrylate |
| octyl methacrylate | octane-1,8-diol dimethacrylate |
| nonyl methacrylate | nonane-1,9-diol dimethacrylate |
| decyl methacrylate | decane-1,10-diol dimethacrylate |
| ethyl hexyl methacrylate | glycerol trimethacrylate |
| styrene | trimethylolpropane trimethacrylate |
| ethylene glycol diacrylate | pentaerythritol trimethacrylate |
| 1,2-propylene glycol diacrylate | pentaerythritol tetramethacrylate |
| | di-pentaerythritol hexamethacrylate |

A further class of polymers includes di-thiol/diene polymers prepared by the copolymerisation of difunctional alkenes with difunctional thiols under free radical conditions. Monofunctional and/or polyfunctional alkenes and/or thiols may be incorporated in order to modify the properties of the polymer, for example to reduce the molecular weight of the polymer or to introduce a controlled degree of crosslinking in the polymer. The following materials given by way of example only may be included in polymers suitable for use in embodiments of the invention:

| | |
|---|---|
| methyl acrylate | styrene |
| ethyl acrylate | ethylene glycol diacrylate |
| propyl acrylate | 1,2-propylene glycol diacrylate |
| butyl acrylate | propane-1,3-diol diacrylate |
| pentyl acrylate | butane-1,4-diol diacrylate |
| 2-methylbutyl acrylate | pentane-1,5-diol diacrylate |
| hexyl acrylate | hexane-1,6-diol diacrylate |
| heptyl acrylate | heptane-1,7-diol diacrylate |
| octyl acrylate | octane-1,8-diol diacrylate |
| nonyl acrylate | nonane-1,9-diol diacrylate |
| decyl acrylate | decane-1,10-diol diacrylate |
| ethyl hexyl acrylate | glycerol triacrylate |
| methyl methacrylate | trimethylolpropane triacrylate |
| ethyl methacrylate | pentaerythritol triacrylate |

-continued

| | |
|---|---|
| propyl methacrylate | pentaerythritol tetraacrylate |
| butyl methacrylate | di-pentaerythritol hexaacrylate |
| pentyl methacrylate | ethylene glycol dimethacrylate |
| 2-methylbutyl methacrylate | 1,2-propylene glycol dimethacrylate |
| hexyl methacrylate | propane-1,3-diol dimethacrylate |
| heptyl methacrylate | butane-1,4-diol dimethacrylate |
| octyl methacrylate | pentane-1,5-diol dimethacrylate |
| nonyl methacrylate | hexane-1,6-diol dimethacrylate |
| decyl methacrylate | heptane-1,7-diol dimethacrylate |
| ethyl hexyl methacrylate | octane-1,8-diol dimethacrylate |
| ethylene glycol divinyl ether | nonane-1,9-diol dimethacrylate |
| 1,2-propylene glycol divinyl ether | decane-1,10-diol dimethacrylate |
| propane-1,3-diol divinyl ether | glycerol trimethacrylate |
| butane-1,4-diol divinyl ether | trimethylolpropane trimethacrylate |
| pentane-1,5-diol divinyl ether | pentaerythritol trimethacrylate |
| hexane-1,6-diol divinyl ether | pentaerythritol tetramethacrylate |
| heptane-1,7-diol divinyl ether | di-pentaerythritol hexamethacrylate |
| octane-1,8-diol divinyl ether | ethylene glycol diallyl ether |
| nonane-1,9-diol divinyl ether | 1,2-propylene glycol diallyl ether |
| decane-1,10-diol divinyl ether | propane-1,3-diol diallyl ether |
| glycerol trivinyl ether | butane-1,4-diol diallyl ether |
| trimethylolpropane trivinyl ether | pentane-1,5-diol diallyl ether |
| divinyl benzene | hexane-1,6-diol diallyl ether |
| butane-1,3-diene | heptane-1,7-diol diallyl ether |
| pentane-1,4-diene | octane-1,8-diol diallyl ether |
| hexane-1,5-diene | nonane-1,9-diol diallyl ether |
| heptane-1,7-diene | decane-1,10-diol diallyl ether |
| octane-1,7-diene | glycerol triallyl ether |
| nonane-1,8-diene | trimethylolpropane triallyl ether |
| decane-1,9-diene | di-allyl malonate |
| ethylene glycol dithioglycollate | di-allyl succinate |
| 1,2-propylene glycol dithioglycollate | di-allyl glutanate |
| propane-1,3-diol dithioglycollate | di-allyl hexane-1,6-dicarboxylate |
| butane-1,4-diol dithioglycollate | di-allyl keptane-1,7-dicarboxylate |
| pentane-1,5-diol dithioglycollate | di-allyl octane-1,8-dicarboxylate |
| hexane-1,6-diol dithioglycollate | di-allyl nonane-1,9-dicarboxylate |
| heptane-1,7-diol dithioglycollate | di-allyl decane-1,10-dicarboxylate |
| octane-1,8-diol dithioglycollate | di-allyl undecane-1,11-dicarboxylate |
| nonane-1,9-diol dithioglycollate | di-allyl dodecane-1,12-dicarboxylate |
| decane-1,10-diol dithioglycollate | di-allyl phthalate |
| glycerol trithioglycollate | butane-1,4-diol di-3-mercaptopropionate |
| trimethylolpropane trithioglycollate | pentane-1,5-diol di-3-mercaptopropionate |
| pentaerythritol trithioglycollate | hexane-1,6-diol di-3-mercaptopropionate |
| pentaerythritol tetrathioglycollate | heptane-1,7-diol di-3-mercaptopropionate |
| di-pentaerythritol hexathioglycollate | octane-1,8-diol di-3-mercaptopropionate |
| 4,4'-thiobisbenzenethiol | nonane-1,9-diol di-3-mercaptopropionate |
| di-allyl iso-phthalate | decane-1,10-diol di-3-mercaptopropionate |
| di-allyl terephthalte | glycerol tri-3-mercaptopropionate |
| ethane dithiol | trimethylolpropane tri-3-mercaptopropionate |
| propane dithiol | pentaerythritol tri-3-mercaptopropionate |
| butane dithiol | pentaerythritol tetra-3-mercaptopropionate |
| pentane dithiol | di-pentaerythritol hexa-3-mercaptopropionate |
| hexane dithiol | Also commercial polymers from Norland and Merck eg Norland 65, Norland 63 and Merck MXM035 |
| heptane dithiol | |
| octane dithiol | |
| nonane dithiol | |
| decane dithiol | |
| undecane dithiol | |
| dodecane dithiol | |
| ethylene glycol | di-3-mercaptopropionate |
| 1,2-propylen glycol | di-3-mercaptopropionate |
| propane-1,3-diol | di-3-mercaptopropionate |

What is claimed is:

1. A liquid crystal device comprising:
   a layer of a liquid crystal material contained between two spaced cell wall carrying electrodes structures and an alignment treatment on at least one wall, characterized by
   means for reducing anchoring energy at the surface alignment on one or both cell walls, comprising:
   an oligomer or polymer within the liquid crystal material at the cell walls.

2. The device of claim 1 wherein the means for reducing energy is an oligomer containing esters, thiols, and/or acrylate monomers within the liquid crystal material at the cell walls.

3. The device of claim 1 wherein the oligomer or polymer has imperfect solubility in the liquid crystal material.

4. The device of claim 1 wherein the oligomer or polymer has a physical affinity for the surface of the cell wall.

5. The device of claim 1 wherein the oligomer or polymer retains a substantially liquid like surface at the polymer and liquid crystal material interface.

6. The device of claim 1 wherein the oligomer or polymer is substantially non-crystalline within the liquid crystal material.

7. The device of claim 1 wherein the oligomer or polymer reduces the liquid crystal material order parameter at or adjacent the cell walls.

8. The device of claim 1 wherein the oligomer or polymer changes the phase of the liquid crystal material at or adjacent the cell walls.

9. The device of claim 1 wherein the oligomer or polymer has a glass transition temperature below the operating temperature range of the device.

10. The device of claim 1 wherein the oligomer or polymer is substantially linear or includes branch points, either with or without crosslinking.

11. The device of claim 1 wherein the oligomer or polymer has a number of repeat units within the range of 4 to 1000.

12. A method of making a liquid crystal device comprising the steps of:
    providing a layer of a liquid crystal material contained between two spaced cell wall carrying electrodes structures and an alignment treatment on at least one wall, characterized by
    the step of reducing anchoring energy at the surface alignment on one or both cell walls, providing an oligomer or polymer within the liquid crystal material at the cell walls.

13. The method of claim 12 wherein the oligomer or polymer is formed by polymerization of reactive low molecular weight materials in solution in the liquid crystal material.

14. The method of claim 12 wherein the oligomer or polymer is formed by polymerization of reactive low molecular weight materials in solution in the liquid crystal material prior its introduction between the cell walls.

15. The method of claim 12 wherein the oligomer or polymer is formed by polymerization of reactive low molecular weight materials in solution in the liquid crystal material after to its introduction between the cell walls.

16. The method of claim 12 wherein the oligomer or polymer is formed by polymerization of reactive low molecular weight materials in the presence of an inert solvent which is then removed and the resulting polymer dissolved in the liquid crystal material prior to its introduction between the cell walls.

17. A twisted nematic liquid crystal device capable of being switched from a twisted state to a non twisted state comprising:
   two cell walls enclosing a layer of nematic liquid crystal material;
   electrode structures on both walls for applying an electric field across the liquid crystal layer;
   a surface alignment on both cell walls providing alignment direction to liquid crystal molecules and arranged so that a twisted nematic structure is formed across the liquid crystal layer;
   means for distinguishing between the two different optical states of the liquid crystal material; characterized by
   means for reducing zenithal anchoring energy in the surface alignment on one or both cell walls, comprising:
      an oligomer or polymer within the liquid crystal material at the cell walls.

18. The device of claim 17 wherein the means for reducing zenithal anchoring energy is an oligomer which is coated onto the inner surface of one or both cell walls either spread on the surface or added to the liquid crystal material.

19. The device of claim 18 wherein the means for reducing zenithal anchoring energy is an oligomer incorporated in the liquid crystal material.

20. The device of claim 17 wherein the means for reducing zenithal anchoring energy is N65, or MXM035.

21. The device of claim 17 wherein the means for reducing zenithal anchoring energy is a material containing esters, thiols, and/or acrylate monomers.

22. The device of claim 17 wherein the means for reducing zenithal anchoring energy reduces the liquid crystal material order parameter at or adjacent the cell walls.

23. The device of claim 17 wherein the means for reducing zenithal anchoring energy changes the phase of the liquid crystal material at or adjacent the cell walls.

24. The device of claim 17 including means for reducing azimuthal anchoring energy.

25. The device of claim 17 the surface alignment provides a pretilted nematic alignment on both cell walls.

26. The device of claim 17 wherein the surface alignment is provided by a rubbed polymer, a photo-ordered polymer or an obliquely evaporated inorganic material.

27. The device of claim 17 wherein the surface alignment layer is a surface monograting with an asymmetric groove profile.

28. The device of claim 17 wherein the alignment directions on the two surfaces are substantially perpendicular.

29. The device of claim 17 wherein the liquid crystal director twists by about 90° throughout the thickness of the cell.

30. The device of claim 17 wherein the liquid crystal director twists is greater than 180° and less than 360°.

31. The device of claim 17 wherein the nematic liquid crystal material contains a small amount (<5%) of a chiral dopant material.

32. A bistable nematic liquid crystal device capable of being switched into two different stable states comprising:
   two cell walls enclosing a layer of nematic, liquid crystal material;
   electrode structures an both walls;
   a surface alignment on one or both cell walls providing two alignment directions to liquid crystal molecules with an amount of surface pretilt; means for distinguishing between switched states of the liquid crystal material; characterized by
   means for reducing inelastic azimuthal memory anchoring energy in the surface alignment on one or both cell walls, comprising:
      an oligomer or polymer within the liquid crystal material at the cell walls.

33. The device of claim 32 and including means for reducing zenithal anchoring energy.

34. The device of claim 32 wherein the means for reducing the anchoring energy is an oligomer or polymer which is either spread on the surface or added to the liquid crystal material.

35. The device of claim 34 wherein the oligomer is a material selected from:

| Norland N65 | |
|---|---|
| —[S(CH$_2$)$_6$SCH$_2$CH$_2$O(CH$_2$)$_6$OCH$_2$CH$_2$]$_n$— | HDVE (Hexane-1,6-diol di(vinyl ether)) |
| CH$_2$=CHO(CH$_2$)$_6$OCH=CH$_2$ | |
| CH$_2$=CHOC$_4$H$_9$ | BVE (Butyl vinyl ether) |
| HSCH$_2$CO$_2$(CH$_2$)$_2$OCOCHS$_2$H | EGTG (Ethylene glycol bis(thioglycollate)) |
| HS(CH$_2$)$_9$SH | NDT (Nonane-1,9-dithiol). |

36. The device of claim 34 wherein the oligomer is an amount up to 10% by weight in the liquid crystal material.

37. The device of claim 34 wherein the chain length (n) is less than 100 repeat units.

38. The device of claim 34 wherein the oligomer's parameters of type, concentration, and chain length, are arranged to reduce the liquid crystal order parameter at or adjacent the cell wall.

39. The device of claim 34 wherein the oligomer's parameters of type, concentration, and chain length, are arranged to change the phase of the liquid crystal material at or adjacent the cell wall.

40. The device of claim 34 wherein the oligomer is a material that has been precured prior to introduction between the cell walls.

41. The device of claim 34 wherein the oligomer is a material that has been precured after introduction between the cell walls.

42. The device of claim 32 wherein the surface alignment is provided by a bigrating surface.

43. A smectic liquid crystal device comprising:
   a liquid crystal cell including a layer of smectic liquid crystal material contained between two walls bearing electrodes and surface treated to give both an alignment and a surface tilt to liquid crystal molecules; characterized by
   means for reducing anchoring energy at the surface alignment on one or both cell walls, comprising:
      an oligomer or polymer within the liquid crystal material at the cell walls.

44. The device of claim 43 wherein the means for reducing energy is an oligomer containing esters, thiols, and/or acrylate monomers within the liquid crystal material at the cell walls.

45. The device of claim 43 wherein the oligomer or polymer has imperfect solubility in the liquid crystal material.

46. The device of claim 43 wherein the oligomer or polymer has a physical affinity for the surface of the cell wall.

47. The device of claim 43 wherein the oligomer or polymer retains a substantially liquid like surface at the polymer and liquid crystal material interface.

48. The device of claim 43 wherein the oligomer or polymer is substantially non-crystalline within the liquid crystal material.

49. The device of claim 43 wherein the oligomer or polymer reduces the liquid crystal material order parameter at or adjacent the cell walls.

50. The device of claim 43 wherein the oligomer or polymer changes the phase of the liquid crystal material at or adjacent the cell walls.

51. The device of claim 43 wherein the liquid crystal material is a chiral smectic material, the alignment directions on the two cell walls are substantially parallel, and the device is a bistable device.

52. The device of claim 43 wherein the alignment directions on the two cell walls are non parallel.

53. The device of claim 43 wherein the liquid crystal material is a non-chiral smectic material.

54. The device of claim 43 wherein the liquid crystal material is a smectic A material.

55. The device of claim 43 wherein the alignment is provided by a grating surface.

56. The device of claim 43 wherein the alignment is provided by a rubbed polymer surface.

57. The device of claim 43 wherein one cell wall has an alignment treatment, the other cell wall has no azimuthal alignment direction, and both cell walls are treated with the means for reducing anchoring energy.

* * * * *

UNITED STATES PATENT AND TRADEMARK OFFICE
CERTIFICATE OF CORRECTION

PATENT NO. : 6,727,968 B1
DATED : April 27, 2004
INVENTOR(S) : Guy Peter Bryan-Brown et al.

It is certified that error appears in the above-identified patent and that said Letters Patent is hereby corrected as shown below:

Column 31,
Line 50, change "the surface" to -- wherein the surface --.

Column 32,
Line 5, change "an both walls" to -- on both walls --.

Signed and Sealed this

Sixth Day of September, 2005

JON W. DUDAS
*Director of the United States Patent and Trademark Office*